United States Patent
Aihara et al.

(10) Patent No.: US 8,240,591 B2
(45) Date of Patent: Aug. 14, 2012

(54) WEBBING RETRACTOR, METHOD OF CONTROLLING WEBBING RETRACTOR, AND VEHICLE

(75) Inventors: Kazuhiko Aihara, Aichi-ken (JP); Teruhiko Koide, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 370 days.

(21) Appl. No.: 11/869,286

(22) Filed: Oct. 9, 2007

(65) Prior Publication Data

US 2008/0087754 A1  Apr. 17, 2008

(30) Foreign Application Priority Data

Oct. 12, 2006  (JP) ................. 2006-279153

(51) Int. Cl.
*B60R 22/28* (2006.01)
*B60R 22/36* (2006.01)
*B60R 22/46* (2006.01)

(52) U.S. Cl. .............. 242/374; 242/379.1; 242/383; 242/384

(58) Field of Classification Search .......... 242/374, 242/379.1, 383, 384; 280/805, 806, 807; 297/470–472, 475–478
See application file for complete search history.

(56) References Cited

U.S. PATENT DOCUMENTS

| | | | |
|---|---|---|---|
| 5,522,564 A * | 6/1996 | Schmidt et al. | 242/374 |
| 5,526,996 A * | 6/1996 | Ebner et al. | 242/374 |
| 5,788,176 A * | 8/1998 | Ebner et al. | 242/374 |
| 5,887,814 A | 3/1999 | Matsuki et al. | |
| 5,938,135 A * | 8/1999 | Sasaki et al. | 242/374 |
| 5,967,442 A * | 10/1999 | Wier | 242/379.1 |
| 6,012,667 A * | 1/2000 | Clancy et al. | 242/379.1 |
| 6,105,893 A * | 8/2000 | Schmidt et al. | 242/374 |
| 6,435,441 B1 | 8/2002 | Kajiyama et al. | |
| 6,616,081 B1 | 9/2003 | Clute et al. | |
| 2001/0050474 A1 * | 12/2001 | Nagata et al. | 280/735 |
| 2005/0040631 A1 * | 2/2005 | Clancy et al. | 280/735 |
| 2005/0139711 A1 * | 6/2005 | Bell et al. | 242/379.1 |
| 2005/0284978 A1 | 12/2005 | Zolkower | |
| 2006/0273210 A1 * | 12/2006 | Clute et al. | 242/374 |

FOREIGN PATENT DOCUMENTS

| | | |
|---|---|---|
| DE | 199 27 427 A1 | 1/2001 |
| DE | 10 2005 012 526 A1 | 9/2006 |
| EP | 0 709 266 A1 | 5/1996 |
| JP | 2005-231387 A | 9/2005 |
| JP | 2006-256513 A | 9/2006 |

OTHER PUBLICATIONS

Japanese Notice of Reasons for Rejection (I.E. Office Action), Issued May 10, 2011, Issued in a Japanese Patent Application Corresponding to the Above-Identified Application.

* cited by examiner

*Primary Examiner* — Michael Mansen
*Assistant Examiner* — Scott Haughland
(74) *Attorney, Agent, or Firm* — Roberts Mlotkowski Safran & Cole P.C.

(57) ABSTRACT

In a webbing retractor, due to operation of a pretensioner mechanism, a stopper wire is moved, and second lock pawls of a second lock base mesh-together with an inner ratchet of a lock ring. In this way, a limit load by a torsion shaft can be switched to a high load. Therefore, immediately after operation of the pretensioner mechanism, the limit load by the torsion shaft can be made to be to the high load, and the limit load can be made to be the high load at an early stage.

3 Claims, 14 Drawing Sheets

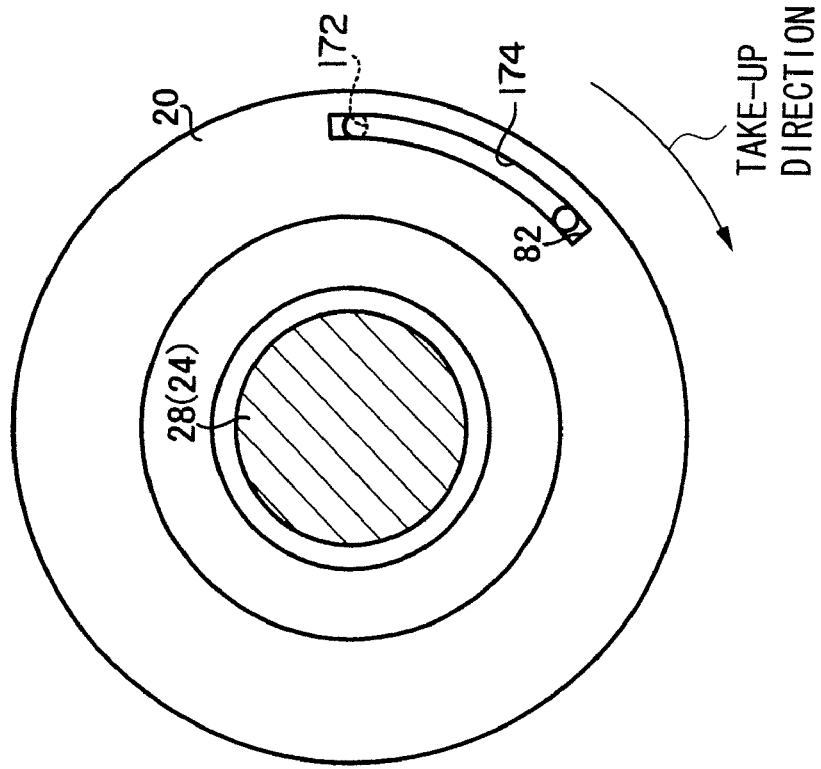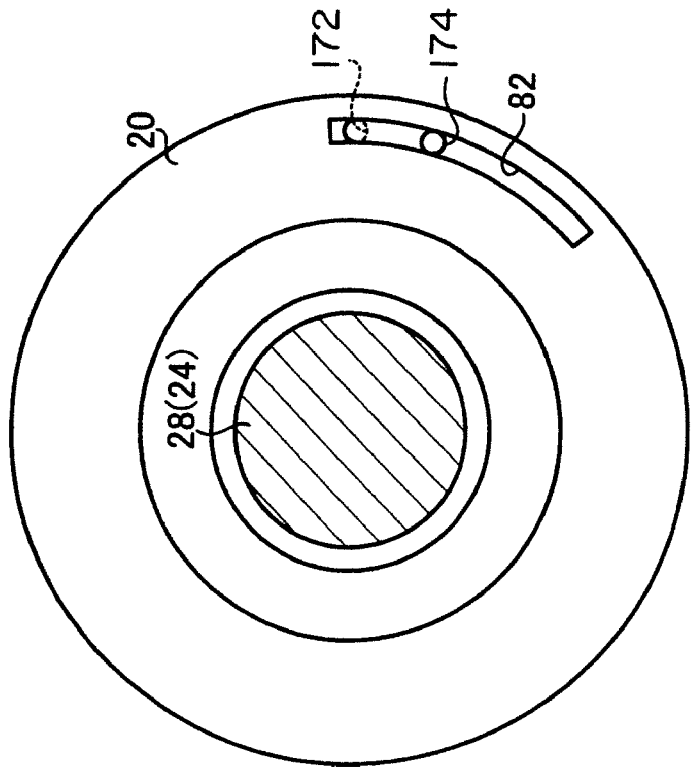

WEBBING RETRACTOR, METHOD OF CONTROLLING WEBBING RETRACTOR, AND VEHICLE

CROSS-REFERENCE TO RELATED APPLICATION

This application claims priority under 35 USC 119 from Japanese Patent Application No. 2006-279153, the disclosure of which is incorporated by reference herein.

BACKGROUND OF THE INVENTION

1. Field of the Invention

The present invention relates to a webbing retractor which limits, to a limit load, the load which a force limiter mechanism applies from a webbing to a vehicle occupant at the time of a vehicle emergency, and to a method of controlling the webbing retractor, and to a vehicle provided with the webbing retractor.

2. Description of the Related Art

Among webbing retractors, there are those which limit, to a limit load, the load which a force limiting device (force limiter mechanism) applies to a vehicle occupant from a belt (webbing) (see, for example, Japanese Patent Application National Publication No. 2003-502204).

In such a webbing retractor, a switching device switches the limit load by the force limiting device from high level to low level.

Here, in the webbing retractor, in particular in cases in which the vehicle occupant has a large physique or the like, it is preferable for the limit load by the force limiting device to be made to be a high level at an early stage.

SUMMARY OF THE INVENTION

In view of the aforementioned, an object of the present invention is to provide a webbing retractor which can make a limit load by a force limiter mechanism be a high load at an early stage, and a method of controlling a webbing retractor, and a vehicle.

A webbing retractor in accordance with a first aspect of the present invention has: a take-up shaft on which a webbing, which is applied to a vehicle occupant, is wound, and, due to the take-up shaft being rotated in a take-up direction, the webbing is taken-up, and, due to the take-up shaft being rotated in a pull-out direction, the webbing is pulled-out; a pretensioner mechanism which, by being operated at a time of a vehicle emergency, rotates the take-up shaft in the take-up direction; a force limiter mechanism which, at the time of the vehicle emergency, permits rotation of the take-up shaft in the pull-out direction and limits a load, which is applied to the vehicle occupant from the webbing, to a limit load, the force limiter mechanism being able to switch the limit load at least to a low load and a high load; first switching component set in a switching state due to operation of the pretensioner mechanism; and second switching component, operated due to the first switching component being set in the switching state, for switching the limit load at least to the low load and the high load.

In the webbing retractor relating to the first aspect of the present invention, the webbing, which is applied to the vehicle occupant, is wound on the take-up shaft. Due to the take-up shaft being rotated in the take-up direction, the webbing is taken-up. Due to the take-up shaft being rotated in the pull-out direction, the webbing is pulled-out.

At the time of the vehicle emergency, due to the pretensioner mechanism being operated, the take-up shaft is rotated in the take-up direction. In this way, the webbing is taken-up, and the force by which the webbing restrains the vehicle occupant is improved.

Further, at the time of the vehicle emergency, the force limiter mechanism permits rotation of the take-up shaft in the pull-out direction. The load which is applied to the vehicle occupant from the webbing is thereby limited to the limit load.

The limit load by the force limiter mechanism can be switched at least to a low load and a high load. Due to the first switching component being set in the switching state, the second switching component is operated. In this way, the second switching component can switch the limit load by the force limiter mechanism at least to the low load and the high load.

Here, the first switching component is set in the switching state due to operation of the pretensioner mechanism. Therefore, the limit load by the force limiter mechanism can be made to be the high load at an early stage.

In a webbing retractor relating to a second aspect of the present invention, in the webbing retractor relating to the first aspect, the second switching component switches the limit load to the high load.

In the webbing retractor relating to the second aspect of the present invention, the second switching component switches the limit load by the force limiter mechanism to the high load. Therefore, the limit load by the force limiter mechanism can be made to be the high load at an early stage.

In a webbing retractor relating to a third aspect of the present invention, the webbing retractor relating to the first aspect further has a driving member provided at the take-up shaft and able to rotate integrally with the take-up shaft, and, due to the driving member rotating relative to the take-up shaft due to operation of the pretensioner mechanism, the first switching component is set in the switching state.

In the webbing retractor relating to the third aspect of the present invention, the driving member which is provided at the take-up shaft can rotate integrally with the take-up shaft. Due to the driving member rotating relative to the take-up shaft due to operation of the pretensioner mechanism, the first switching component is set in the switching state. Therefore, the limit load by the force limiter mechanism can be made to be the high load at an early stage by a simple structure.

A webbing retractor relating to a fourth aspect of the present invention has: a take-up shaft on which a webbing, which is applied to a vehicle occupant, is wound, and, due to the take-up shaft being rotated in a take-up direction, the webbing is taken-up, and, due to the take-up shaft being rotated in a pull-out direction, the webbing is pulled-out; a pretensioner mechanism which, by being operated at a time of a vehicle emergency, rotates the take-up shaft in the take-up direction; a force limiter mechanism which, at the time of the vehicle emergency, permits rotation of the take-up shaft in the pull-out direction and limits a load, which is applied to the vehicle occupant from the webbing, to a limit load, the force limiter mechanism being able to switch the limit load at least to a low load and a high load; and switching component for switching the limit load from the low load to the high load due to operation of the pretensioner mechanism.

In the webbing retractor relating to the fourth aspect of the present invention, the webbing, which is applied to the vehicle occupant, is wound on the take-up shaft. Due to the take-up shaft being rotated in the take-up direction, the webbing is taken-up. Due to the take-up shaft being rotated in the pull-out direction, the webbing is pulled-out.

At the time of the vehicle emergency, due to the pretensioner mechanism being operated, the take-up shaft is rotated in the take-up direction. In this way, the webbing is taken-up, and the force by which the webbing restrains the vehicle occupant is improved.

Further, at the time of the vehicle emergency, the force limiter mechanism permits rotation of the take-up shaft in the pull-out direction. The load which is applied to the vehicle occupant from the webbing is thereby limited to the limit load.

Here, the limit load by the force limiter mechanism can be switched at least to a low load and a high load. Due to operation of the pretensioner mechanism, the switching component switches the limit load by the force limiter mechanism from the low load to the high load. Therefore, the limit load by the force limiter mechanism can be made to be the high load at an early stage.

In a webbing retractor relating to a fifth aspect of the present invention, the webbing retractor relating to the fourth aspect further has a driving member provided at the take-up shaft and able to rotate integrally with the take-up shaft, and, due to the driving member rotating relative to the take-up shaft due to operation of the pretensioner mechanism, the switching component switches from the low load to the high load.

In the webbing retractor relating to the fifth aspect of the present invention, the driving member which is provided at the take-up shaft can rotate integrally with the take-up shaft. Due to the driving member rotating relative to the take-up shaft due to operation of the pretensioner mechanism, the switching component switches the limit load by the force limiter mechanism from the low load to the high load. Therefore, the limit load by the force limiter mechanism can be made to be the high load at an early stage by a simple structure.

A method of controlling a webbing retractor of the present invention is a method of controlling a webbing retractor which has: a take-up shaft on which a webbing, which is applied to a vehicle occupant, is wound, and, due to the take-up shaft being rotated in a take-up direction, the webbing is taken-up, and, due to the take-up shaft being rotated in a pull-out direction, the webbing is pulled-out; a pretensioner mechanism which, by being operated at a time of a vehicle emergency, rotates the take-up shaft in the take-up direction; and a force limiter mechanism which, at the time of the vehicle emergency, permits rotation of the take-up shaft in the pull-out direction and limits a load, which is applied to the vehicle occupant from the webbing, to a limit load, the force limiter mechanism being able to switch the limit load at least to a low load and a high load, the method comprising: setting a first switching component in a switching state by operation of the pretensioner mechanism; and switching the limit load at least to the low load and the high load by operating a second switching component by setting the first switching component in the switching state.

A vehicle of the present invention is provided with the webbing retractor relating to the first aspect or the fourth aspect of the present invention.

BRIEF DESCRIPTION OF THE DRAWINGS

FIG. 7A is a front view showing the positional relationship between a spool and a stopper wire, and shows a state before the stopper wire moves;

FIG. 7B is a front view showing the positional relationship between the spool and the stopper wire, and shows a state when the stopper wire has moved;

DETAILED DESCRIPTION OF THE INVENTION

<Structure of First Exemplary Embodiment>

A first exemplary embodiment of the present invention will be described next by using FIG. 1 through FIG. 10.

Note that the characteristic operation and effects of the first exemplary embodiment will be described by comparing a first aspect and a second aspect of the first exemplary embodiment. Therefore, first, the respective structures of the first aspect and the second aspect will be described.

(Structure of First Aspect)

Figure 5:
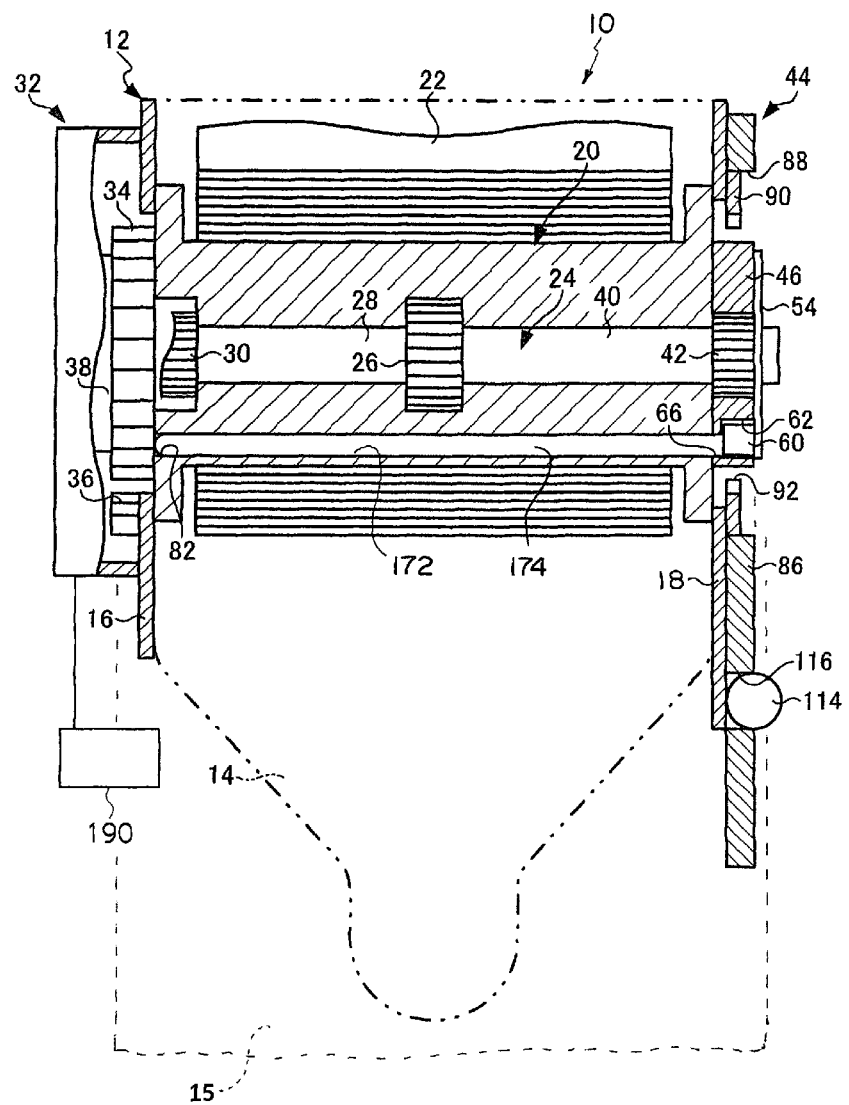
FIG. 5 is a front sectional view showing a summary of the structure of a webbing retractor relating to a first aspect of the first exemplary embodiment of the present invention.

A summary of the structure of a webbing retractor 10 relating to the first aspect of the first exemplary embodiment of the present invention is shown in a cross-sectional view in FIG. 5.

As shown in FIG. 5, the webbing retractor 10 has a frame 12. The frame 12 has a plate-shaped rear plate 14 which is fixed to the body of a vehicle 15. A leg plate 16 extends, substantially orthogonally to the rear plate 14, from one transverse direction end portion of the rear plate 14. A leg plate 18 extends, in the same direction as the direction in which the leg plate 16 extends, from the other transverse direction end portion of the rear plate 14. In this way, the frame 12 has a substantially concave shape as seen in plan view.

A spool 20 serving as a take-up shaft is provided between the leg plate 16 and the leg plate 18. The axial direction of the spool 20 runs along the direction in which the leg plate 16 and the leg plate 18 oppose one another. The proximal end portion of a webbing belt 22 (seat belt), which is shaped as an elongated strip and serves as a webbing, is anchored to the axial direction intermediate portion of the spool 20. Due to the spool 20 rotating in a take-up direction (the direction of arrow A in FIG. 2) which is one direction around the axis thereof, the spool 20 takes-up the webbing belt 22 from the proximal end side thereof and accommodates the webbing belt 22. The webbing belt 22 is pulled-out due to the spool 20 being rotated in a pull-out direction (the direction of arrow B in FIG. 2) which is the other direction around the axis thereof.

The spool 20 is hollow along its central axis. A torsion shaft 24, which serves as a force limiter mechanism and a first energy absorbing member, is accommodated within the spool 20. The torsion shaft 24 has a joined portion 26. The joined portion 26 is positioned between the axial direction both ends of the spool 20. The torsion shaft 24 is integrally connected to the spool 20 at this joined portion 26.

A rod-shaped first deforming portion 28 is formed continuously from the leg plate 16 side end surface of the joined portion 26. A first joining portion 30 is formed at the distal end side of the first deforming portion 28, so as to be coaxial and integral with the first deforming portion 28. The first joining portion 30 is coaxially and integrally connected to a first lock base 34 which serves as a driving member (rotating body) which structures a first locking mechanism 32 serving as a first locking component in the first aspect.

The first lock base 34 is fit-together from the leg plate 16 side end portion of the spool 20, so as to be coaxial with the spool 20 and able to rotate relative to the spool 20. However, as described above, the first joining portion 30 is connected integrally to the first lock base 34. In this way, basically, the first lock base 34 is connected coaxially and integrally with the spool 20.

A first lock pawl 36 is provided at the radial direction outer side of the first lock base 34. The first lock pawl 36 is pivotally-supported so as to rotate freely at the leg plate 16. When the first lock pawl 36 rotates in a predetermined one direction, ratchet teeth formed at the first lock pawl 36 approach the outer peripheral portion of the first lock base 34, and can mesh-together with ratchet teeth which are formed at the outer peripheral portion of the first lock base 34.

On the other hand, at the side of the first lock base 34 opposite the side at which the spool 20 is disposed, a rotating member 38 is provided so as to be coaxial with the first lock base 34 and able to rotate relative to the first lock base 34. The rotating member 38 is structured so as to rotate following the first lock base 34, due to the urging force of an unillustrated urging component such as a compression coil spring, a torsion coil spring, or the like.

Further, although details thereof are not illustrated, the first locking mechanism 32 has one or plural restricting component for restricting rotation of the rotating member 38. When a large inertia arises at the vehicle at the time of a rapid deceleration of the vehicle (at the time of an emergency), or when the first lock base 34 rotates suddenly in the pull-out direction, the restricting component operates, and rotation of the rotating member 38 is restricted. The first lock pawl 36 moves so as to approach the outer peripheral portion of the first lock base 34, interlockingly with the relative rotation between the first lock base 34 and the rotating member 38 which arises at the time when the first lock base 34 attempts to rotate in the pull-out direction in the state in which rotation of the rotating member 38 is restricted.

A pretensioner mechanism 190 can mechanically connect with the first lock base 34. The pretensioner mechanism 190 is connected to an ECU (control device) of the vehicle. The ECU is connected to an acceleration sensor which senses a state of rapid deceleration of the vehicle. When the acceleration sensor senses a state of rapid deceleration of the vehicle, the pretensioner mechanism 190 is operated, and the first lock base 34 is suddenly made able to rotate in the take-up direction.

On the other hand, a rod-shaped second deforming portion 40 is formed continuously from the leg plate 18 side end surface of the joined portion 26. A second joining portion 42 is formed coaxially and integrally with the second deforming portion 40, at the distal end side of the second deforming portion 40. The second joining portion 42 is connected coaxially and integrally to a second lock base 46 which serves as a first rotating member and structures a second locking mechanism 44 serving as a second switching component (second locking component).

The second lock base 46 is fit-together from the leg plate 18 side end portion of the spool 20, so as to be coaxial with the spool 20 and able to rotate relative to the spool 20. However, as described above, the second joining portion 42 is connected integrally to the second lock base 46. In this way, basically, the second lock base 46 is connected coaxially and integrally with the spool 20.

Figure 1:
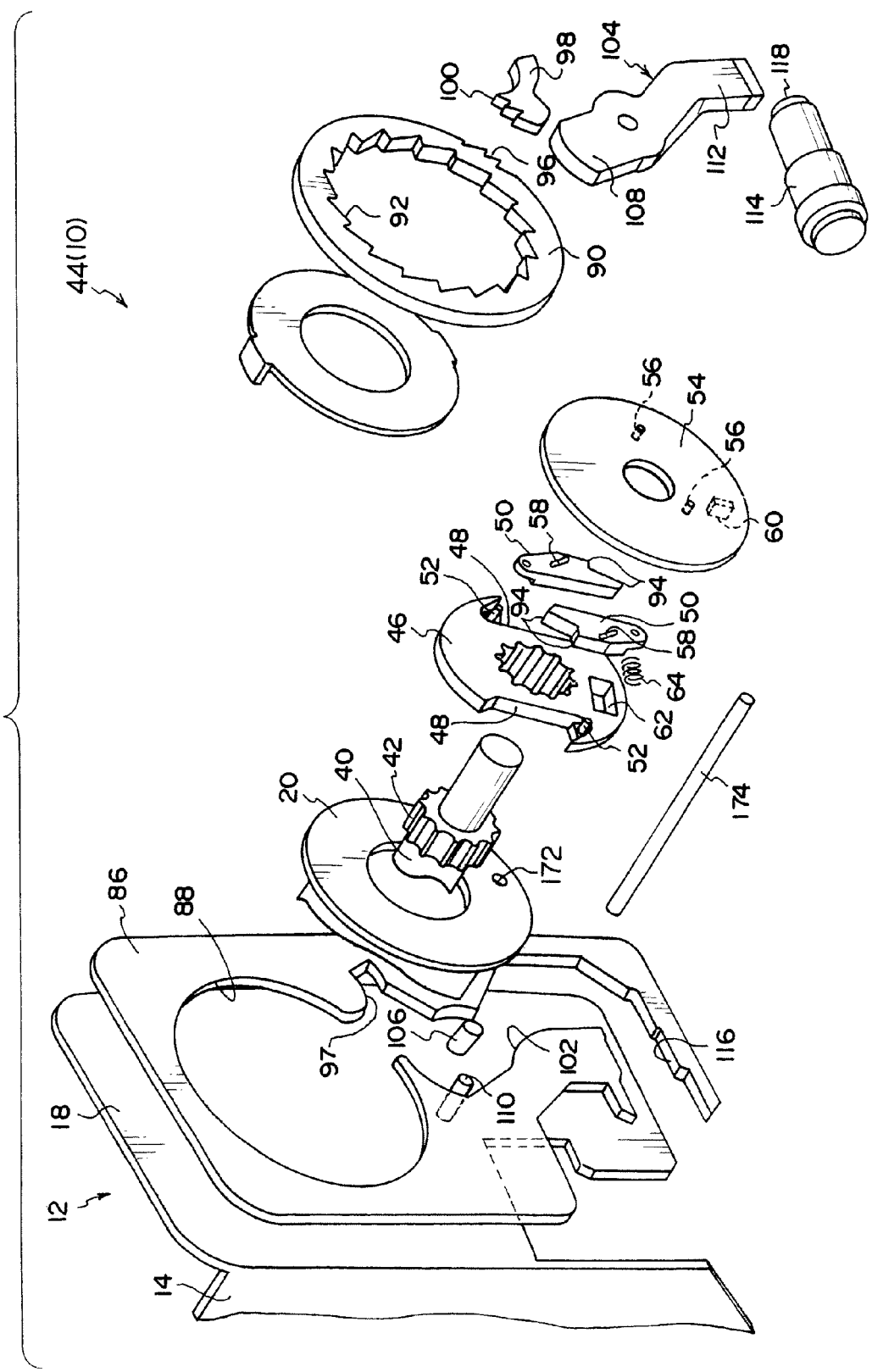
FIG. 1 is an exploded perspective view showing the structure of a second locking mechanism of a webbing retractor relating to a first exemplary embodiment of the present invention.
Figure 2:
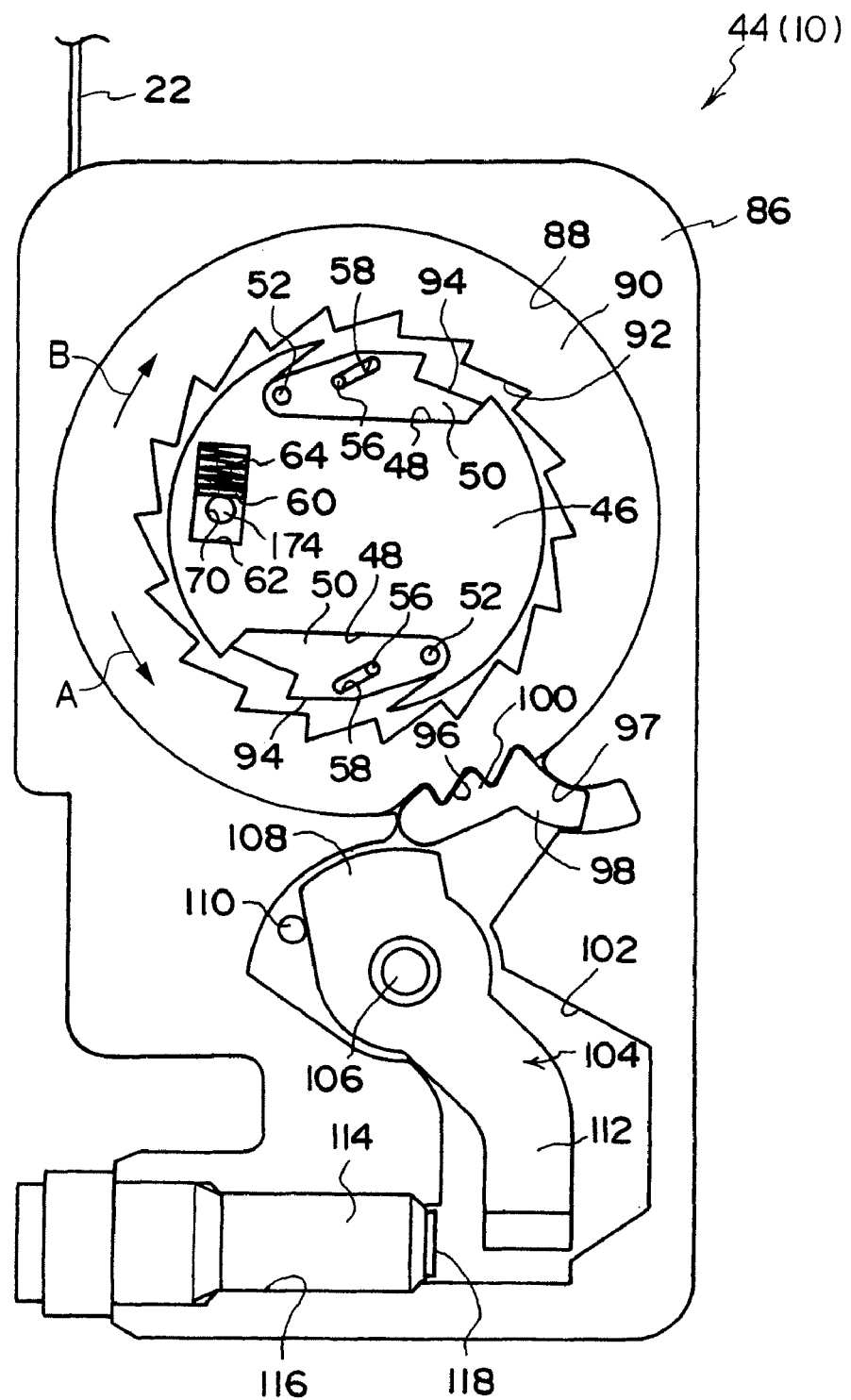
FIG. 2 is a front view showing a summary of the structure of the second locking mechanism in the webbing retractor relating to the first exemplary embodiment of the present invention.
Figure 3:
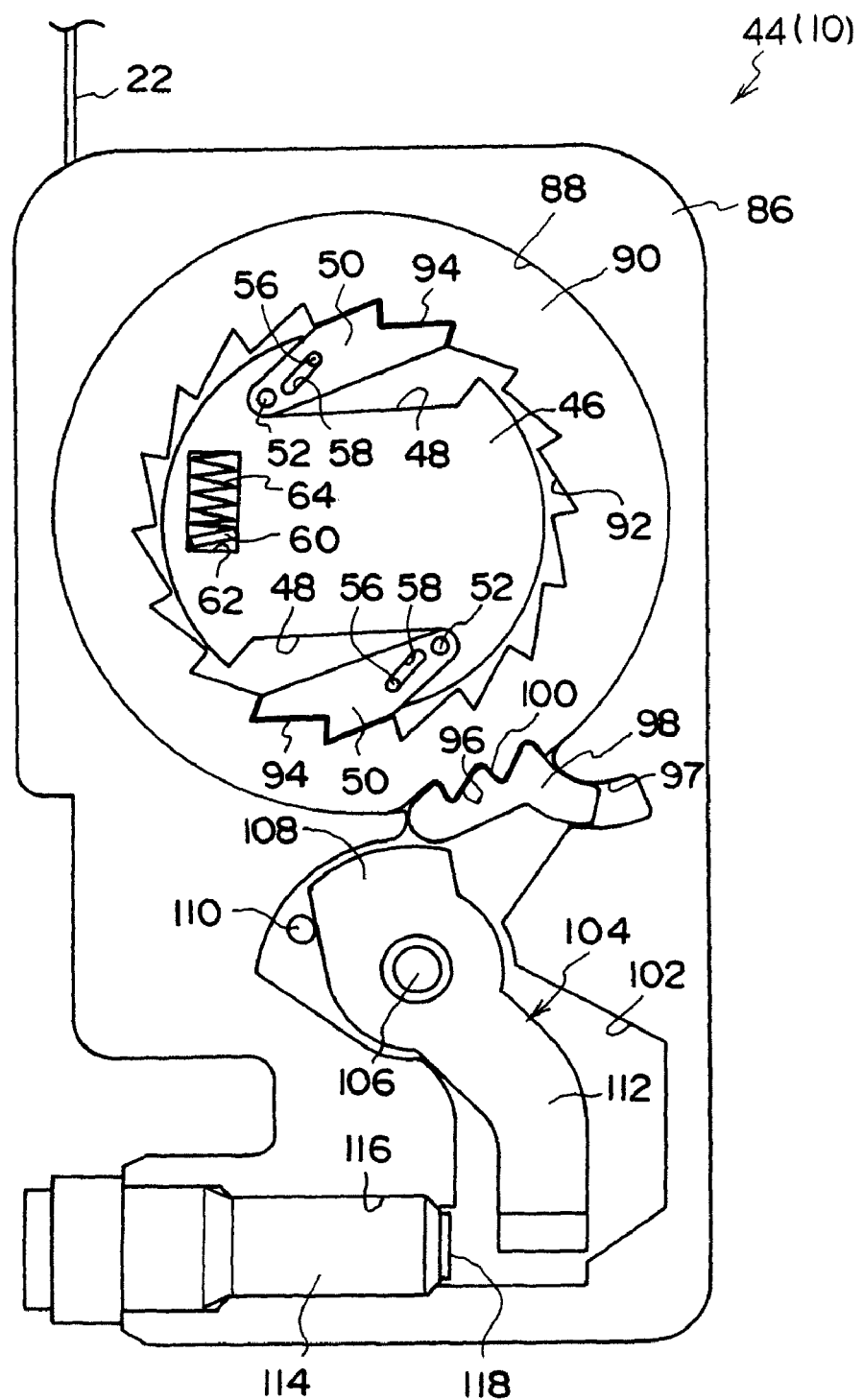
FIG. 3 is a front view corresponding to FIG. 2 and showing an operating state of the second locking mechanism in the webbing retractor relating to the first exemplary embodiment of the present invention.

As shown in FIG. 1 and FIG. 2, a pair of pawl accommodating portions 48 is formed at the second lock base 46. The pawl accommodating portions 48 are open at portions of the outer periphery of the second lock base 46. The pawl accommodating portions 48 open at the end surface of the second lock base 46 which end surface is at the opposite side of the spool 20. Second lock pawls 50 are accommodated in the pawl accommodating portions 48. Each of the second lock pawls 50 is pivotally-supported so as to be rotatable around an axis parallel to the spool 20, by a pawl supporting pin 52 formed within the pawl accommodating portion 48. The second lock pawls 50 are basically accommodated in the pawl accommodating portions 48, respectively. When the second lock pawl 50 rotates in one direction around the pawl supporting pin 52, the distal end side of the second lock pawl 50 projects-out to the outer side from the open portion at the outer peripheral portion of the pawl accommodating portion 48.

On the other hand, a rotating disc 54 is provided at the side of the second lock base 46 opposite the side where the spool 20 is located. The rotating disc 54 basically is pivotally-supported at the spool 20 so as to be coaxial with the spool 20 and able to rotate relative to the spool 20. A pair of guiding pins 56 are formed to project-out from the second lock base 46 side end surface of the rotating disc 54. The guiding pins 56 are provided so as to correspond to the aforementioned second lock pawls 50.

Long holes 58 are formed in the second lock pawls 50 respectively, in correspondence with the guiding pins 56. The guiding pins 56 are disposed in the long holes 58. The widthwise dimensions of the long holes 58 are very slightly larger than the outer diameters of the guiding pins 56. When the guiding pins 56 rotate together with the rotating disc 54 in one direction around the spool 20, the guiding pins 56 push the inner walls of the long holes 58 and rotate the second lock pawls 50 around the pawl supporting pins 52.

A flat-plate-shaped plate 60 is formed to project from the second lock base 46 side end surface of the rotating disc 54. A spring accommodating hole 62 which is rectangular is formed in the second lock base 46 in correspondence with the plate 60. A rotating disc urging spring 64 is accommodated within the spring accommodating hole 62.

The rotating disc urging spring 64 is a compression coil spring. One end of the rotating disc urging spring 64 press-contacts the inner wall of the spring accommodating hole 62. The other end of the rotating disc urging spring 64 press-contacts the plate 60 which is disposed in the spring accommodating hole 62. The rotating disc 54 can rotate in one direction around the spool 20, due to the plate 60 receiving the urging force of the rotating disc urging spring 64. When the rotating disc 54 rotates in one direction around the spool 20, the guiding pins 56 rotate (operate) the second lock pawls 50 in one direction around the pawl supporting pins 52.

On the other hand, as shown in FIG. 5, a through-hole 66 is formed in the floor portion of the spring accommodating hole 62. A stopper accommodating hole 172 is formed in the spool 20 in correspondence with the through-hole 66. The stopper accommodating hole 172 is parallel to the axial center of the spool 20. One end of the stopper accommodating hole 172 opens at the end portion of the spool 20 at the first lock base 34 side. The other end of the stopper accommodating hole 172 opens at the end portion of the spool 20 at the second lock base 46 side. The inner radial dimension of the stopper accommodating hole 172 does not change from the one end to the other end thereof.

A stopper wire 174, which serves as a first switching component, a second energy absorbing member and a controlling component, is accommodated within the stopper accommodating hole 172. The stopper wire 174 is formed in the shape of a rod which is long along the axial direction of the spool 20. One end side of the stopper wire 174 projects-out to the exterior of the stopper accommodating hole 172 from the open end at the first lock base 34 side of the stopper accommodating hole 172.

A wire guiding groove 82 (see FIG. 7A) is formed in correspondence with the portion of the stopper wire 174 which projects-out from the spool 20, at least either one of the first lock base 34 side end portion of the spool 20 and the spool 20 side end portion of the first lock base 34 (in the present exemplary embodiment, the wire guiding groove 82 is formed at the end portion of the spool 20). The wire guiding groove 82 is curved such that the center of curvature thereof is the central axis of the spool 20. One end side of the stopper wire 174 is disposed within the wire guiding groove 82. The one end side of the stopper wire 174 is curved so as to follow the wire guiding groove 82.

Further, the one end portion of the stopper wire 174 is bent toward the first lock base 34 within the wire guiding groove 82. The one end portion of the stopper wire 174 is disposed in a wire anchor hole 84 which is formed in the first lock base 34 shown in FIG. 8.

On the other hand, the other end side of the stopper wire 174 projects-out to the exterior of the spool 20 from the second lock base 46 side end portion of the stopper accommodating hole 172. The stopper wire 174 passes through the through-hole 66, and is disposed within the spring accommodating hole 62 at the side of the plate 60 opposite the side at which the rotating disc urging spring 64 is disposed. In this way, the other end of the stopper wire 174 interferes with the plate 60 which attempts to rotate due to the urging force of the rotating disc urging spring 64.

As shown in FIG. 1 and FIG. 2, a base 86 is connected integrally to the leg plate 18 at the outer side of the leg plate 18. A circular hole 88 is formed in the base 86, coaxially with the spool 20. The inner diameter of the circular hole 88 is sufficiently larger than the second lock base 46. The second lock base 46 is passed-through the circular hole 88. A lock ring 90, which serves as a second rotating member structuring a switching mechanism, is pivotally-supported at the circular hole 88 so as to rotate freely. The lock ring 90 is formed in a ring shape on the whole. Further, an inner ratchet 92 is formed at the inner peripheral portion of the lock ring 90. When the second lock pawls 50 rotate in one direction around the pawl supporting pins 52 and the distal end sides of the second lock pawls 50 project-out to the outer sides of the pawl accommodating portions 48, second pawl ratchets 94 at the distal end sides of the second lock pawls 50 mesh-together with the inner ratchet 92.

An outer ratchet 96 is formed at a portion of the outer periphery of the lock ring 90. A ring locking pawl accommodating hole 97, which communicates with the circular hole 88, is formed in the base 86 in correspondence with the outer ratchet 96. A ring locking pawl 98, which serves as a switching member structuring the switching mechanism, is provided at the inner side of the ring locking pawl accommodating hole 97. A ring locking ratchet 100, which can mesh-together with the outer ratchet 96, is formed at the distal end side of the ring locking pawl 98.

When the lock ring 90 attempts to rotate in the pull-out direction in the state in which the ring locking ratchet 100 is meshed-together with the outer ratchet 96, the ring locking pawl 98 attempts to rotate accompanying the lock ring 90. However, when the ring locking pawl 98 attempts to rotate in the pull-out direction of the lock ring 90 together with the lock ring 90, the inner wall of the ring locking pawl accommodating hole 97 interferes with the ring locking pawl 98, and rotation of the ring locking pawl 98, and accordingly, rotation of the lock ring 90, is restricted.

A supporting arm accommodating hole 102 is formed in the base 86 at the lower side of the ring locking pawl 98. The supporting arm accommodating hole 102 communicates with the aforementioned ring locking pawl accommodating hole 97. A supporting arm 104, which serves as a restricting member structuring the switching mechanism, is accommodated within the supporting arm accommodating hole 102. The supporting arm 104 is pivotally-supported, so as to be able to rotate around an axis parallel to the spool 20, by an arm supporting pin 106 which is formed to project-out from the leg plate 18.

One end side of the supporting arm 104, from the portion which is pivotally-supported by the arm supporting pin 106, is a supporting portion 108. In the state in which the supporting arm 104 is at a supporting position around the arm supporting pin 106, the distal end portion of the supporting portion 108 abuts the ring locking pawl 98 in a state of opposing the side surface of the ring locking pawl 98. In this way, the distal end portion of the supporting portion 108 supports the ring locking pawl 98, in a state in which the ring locking ratchet 100 of the ring locking pawl 98 is meshed-together with the outer ratchet 96 of the lock ring 90.

A shear pin 110 is formed to project-out from the leg plate 18 at a side of the supporting portion 108. The shear pin 110 abuts and interferes with the supporting portion 108. Rotation of the supporting arm 104 in one direction around the arm supporting pin 106 is thereby restricted.

On the other hand, the other end side of the supporting arm 104, from the portion which is pivotally-supported by the arm supporting pin 106, is a pushed portion 112. A gas generator 114 which structures the switching mechanism is provided at the side of the pushed portion 112. The gas generator 114 is disposed within a generator accommodating hole 116 which is formed in the base 86. The gas generator 114 is fixed to the base 86 by unillustrated fastening component or the like such as bolts or the like.

Chemical agents, such as an igniting agent and a gas generating agent and the like, and an igniting device, which ignites the igniting agent due to an electric ignition signal being inputted thereto, are accommodated in the gas generator 114. The igniting device of the gas generator 114 is connected to an ECU.

The ECU is connected directly or indirectly to the acceleration sensor. The ECU is connected directly or indirectly to a danger predicting component which directly or indirectly detects that the vehicle has entered a state of rapid deceleration or that it seems as if the vehicle will enter into a state of rapid deceleration, such as, for example, a distance measuring sensor which detects that the distance to an obstacle in front of the vehicle has become less than a given value. The ECU is connected directly or indirectly to a physique detecting component which directly or indirectly detects the physique of a vehicle occupant who is seated in a seat, such as a load sensor which detects the load applied to the seat of the vehicle, a belt sensor which detects that the webbing belt 22 has been pulled-out by greater than or equal to a given amount from the spool 20, or the like.

The ignition signal is outputted from the ECU to the igniting device of the gas generator 114 when the ECU judges, on the basis of the signal from the danger predicting component, that the vehicle has entered into a state of rapid deceleration or that it seems as if the vehicle will enter into a state of rapid deceleration, and judges, on the basis of the signal from the physique detecting component, that the physique of the vehicle occupant seated in the seat is less than a reference value which is determined in advance.

The gas generator 114 structures a type of a gas cylinder. One axial direction end side of the gas generator 114 opposes the side surface of the pushed portion 112 of the supporting arm 104. A pushing plunger 118 is provided at the gas generator 114. One axial direction end side of the pushing plunger 118 projects-out from the gas generator 114 and opposes the side surface of the pushed portion 112 of the supporting arm 104.

When the igniting agent is ignited due to the ignition signal being inputted to the igniting device of the gas generator 114, and further, the igniting agent which is ignited burns the gas generating agent, gas is generated instantaneously within the gas generator 114. The pressure of this gas works to push the pushing plunger 118 out to the exterior of the gas generator 114. The pushing plunger 118, which is pushed-out to the exterior of the gas generator 114, pushes the pushed portion 112 of the supporting arm 104 and rotates the supporting arm 104.

(Structure of Second Aspect)

The structure of the second aspect of the present exemplary embodiment will be described next. Note that, in describing the second aspect, structures which are basically the same as those of the above-described first aspect are denoted by the same reference numerals, and detailed description thereof is omitted.

Figure 6:
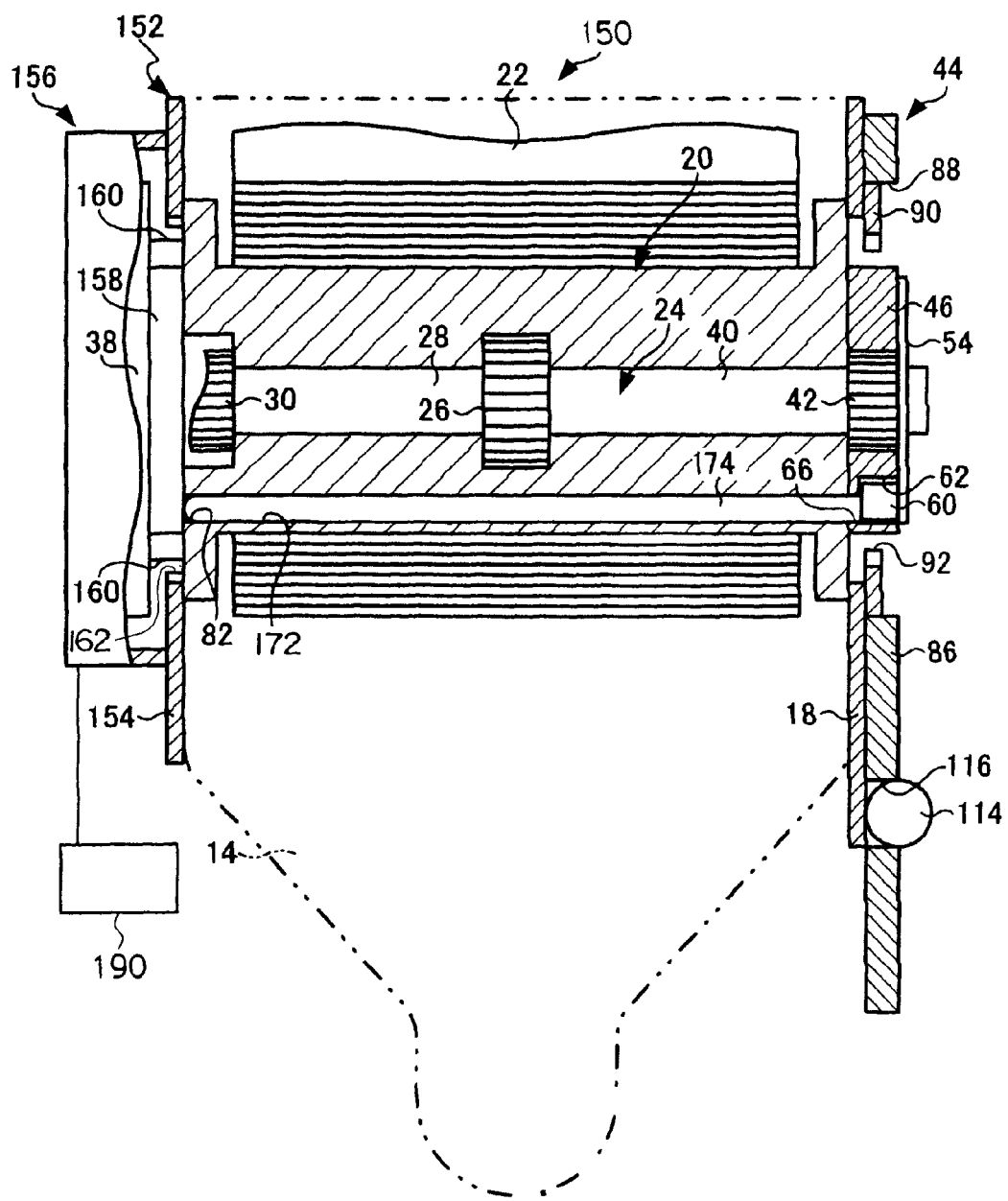
FIG. 6 is a front sectional view showing a summary of the structure of a webbing retractor relating to a second aspect of the first exemplary embodiment of the present invention.
Figure 8:
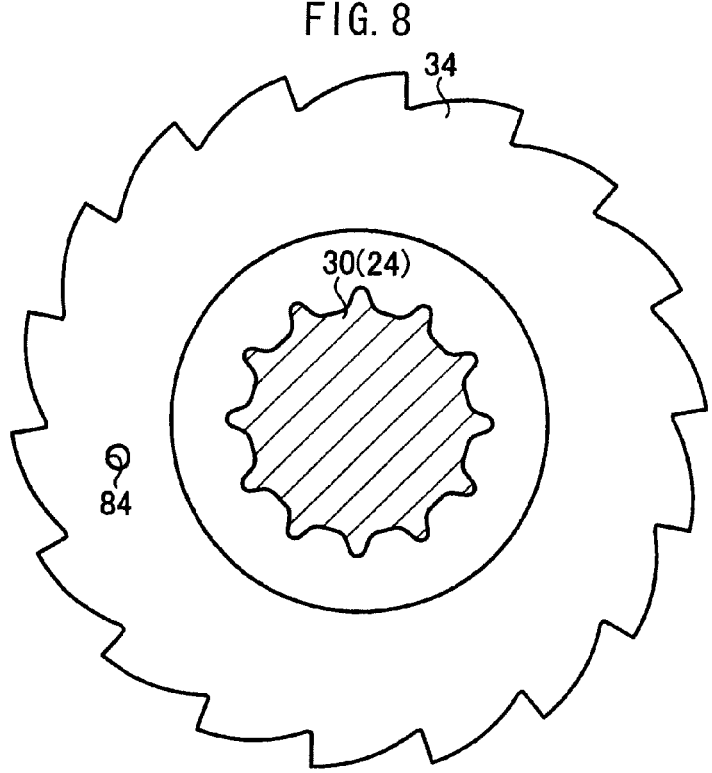
FIG. 8 is a front view of a first lock base in the first aspect.

A summary of the structure of a webbing retractor 150 relating to the second aspect is shown in a cross-sectional view in FIG. 6.

As shown in FIG. 6, the webbing retractor 150 has a frame 152 instead of the frame 12. The frame 152 has a leg plate 154 instead of the leg plate 16. The leg plate 154 has a ratchet hole 162 at whose inner peripheral portion ratchet teeth are formed.

Further, the webbing retractor 150 does not have the first locking mechanism 32 which serves as the first locking component. Instead of the first locking mechanism 32, the webbing retractor 150 has a first locking mechanism 156 which serves as the first locking component in the second aspect.

Figure 9:
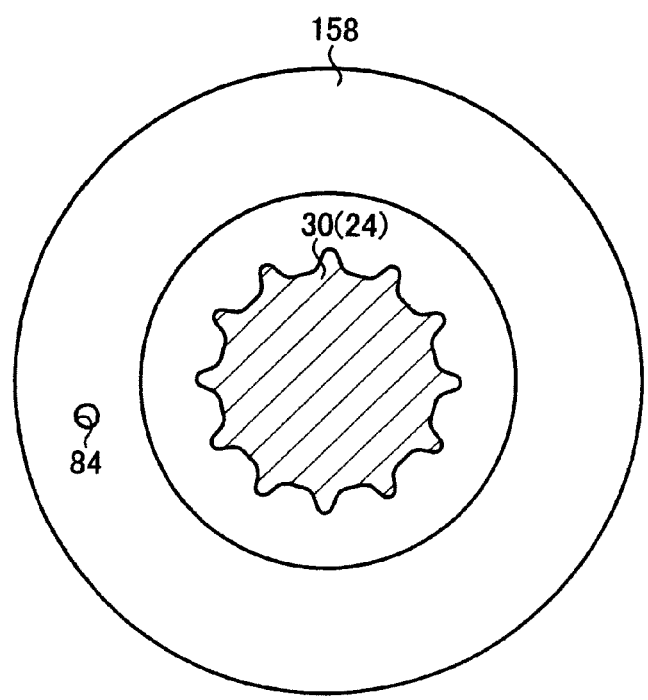
FIG. 9 is a front view of a first lock base in the second aspect.
Figure 10:
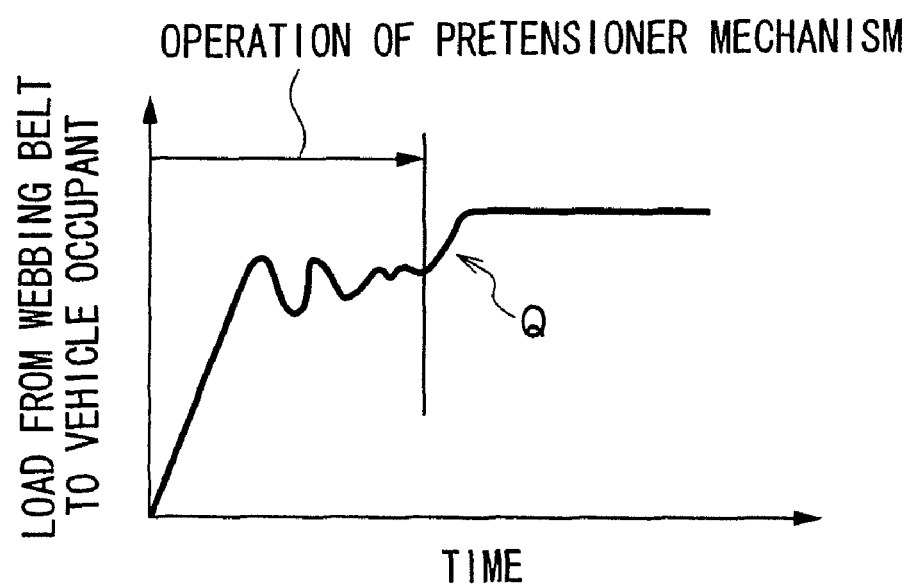
FIG. 10 is a graph showing the relationship between time and load applied from a webbing belt to a vehicle occupant at the time of a vehicle collision, in the webbing retractor relating to the first exemplary embodiment of the present invention.

The first locking mechanism 156 has a first lock base 158 serving as a driving member (rotating body). The structure of the first lock base 158 is the same as that of the first lock base 34 with regard to the following points: the first lock base 158 is fit-together from the leg plate 154 side of the spool 20 so as to be coaxial with and able to rotate relative to the spool 20; the first joining portion 30 is connected coaxially and integrally to the first lock base 158; the wire anchor hole 84 is formed in the first lock base 158; and the like. However, as shown in FIG. 9, ratchet teeth are not formed at the outer peripheral portion of the first lock base 158.

A first lock pawl 160 is mounted to the first lock base 158. The first lock pawl 160 is engaged with the rotating member 38. The first lock pawl 160 approaches the inner peripheral portion of the ratchet hole 162, interlockingly with the relative rotation between the first lock base 158 and the rotating member 38 which arises at the time when the first lock base 158 attempts to rotate in the pull-out direction in the state in which rotation of the rotating member 38 is restricted. In this way, ratchet teeth, which are formed at the distal end of the first lock pawl 160, mesh-together with the ratchet teeth of the ratchet hole 162.

<Operation and Effects of First Exemplary Embodiment>

Next, before the operation and the effects of the present exemplary embodiment are described, the respective operations of the first locking mechanism 32 of the webbing retractor 10 and the first locking mechanism 156 of the webbing retractor 150, and the operation of the pretensioner mechanism 190, will be described.

(Operation of First Locking Mechanism 32 and Pretensioner Mechanism 190)

At the webbing retractor 10, in a state in which the webbing belt 22 which is pulled-out from the spool 20 is applied to the body of the vehicle occupant, when, for example, the vehicle enters into a state of rapid deceleration and the first locking mechanism 32 operates, first, rotation of the rotating member 38 in the pull-out direction is restricted.

Then, when the body of the vehicle occupant, which attempts to move forward due to the inertia at the time of the rapid deceleration of the vehicle, suddenly pulls the webbing belt 22 and attempts to rotate the spool 20 in the pull-out direction, the first lock base 34, which is integrally connected to the spool 20 via the torsion shaft 24, rotates in the pull-out direction.

In this state, if rotation of the rotating member 38 in the pull-out direction is restricted as described above, relative rotation arises between the first lock base 34 and the rotating member 38, and the first lock pawl 36 approaches the first lock base 34.

In this way, the ratchet teeth of the first lock pawl 36 mesh-together with the ratchet teeth of the first lock base 34. Rotation of the first lock base 34 in the pull-out direction, and accordingly, rotation of the spool 20 in the pull-out direction, is restricted, and pulling-out of the webbing belt 22 from the spool 20 is restricted. In this way, the body of the vehicle occupant, which attempts to move forward, can be reliably restrained by the webbing belt 22.

Further, even if the ratchet teeth of the first lock pawl 36 mesh-together with the ratchet teeth of the first lock base 34, rotation of the first lock base 34 in the take-up direction, and accordingly, rotation of the spool 20 in the take-up direction, is not restricted.

Here, when the vehicle enters a state of rapid deceleration and a large inertia arises at the vehicle, the pretensioner mechanism 190 is operated and the first lock base 34 is rotated suddenly in the take-up direction. Therefore, the spool 20 is rotated in the take-up direction, and the webbing belt 22 is taken-up onto the spool 20. In this way, the force by which the webbing belt 22 restrains the body of the vehicle occupant is improved.

(Operation of First Locking Mechanism 156 and Pretensioner Mechanism 190)

On the other hand, at the webbing retractor 150, when the vehicle enters into a state of rapid deceleration and the first locking mechanism 156 operates, first, rotation of the rotating member 38 in the pull-out direction is restricted.

Then, when the body of the vehicle occupant, which attempts to move forward due to the inertia at the time of the rapid deceleration of the vehicle, suddenly pulls the webbing belt 22 and attempts to rotate the spool 20 in the pull-out direction, the first lock base 158, which is integrally connected to the spool 20 via the torsion shaft 24, rotates in the pull-out direction.

In this state, if rotation of the rotating member 38 in the pull-out direction is restricted as described above, relative rotation arises between the first lock base 158 and the rotating member 38, and the first lock pawl 160 approaches the inner peripheral portion of the ratchet hole 162.

In this way, the ratchet teeth of the first lock pawl 160 mesh-together with the ratchet teeth of the ratchet hole 162. Rotation of the first lock base 158 in the pull-out direction, and accordingly, rotation of the spool 20 in the pull-out direction, is restricted, and pulling-out of the webbing belt 22 from the spool 20 is restricted. In this way, the body of the vehicle occupant, which attempts to move forward, can be reliably restrained by the webbing belt 22.

Further, even if the ratchet teeth of the first lock pawl 160 mesh-together with the ratchet teeth of the ratchet hole 162, rotation of the first lock base 158 in the take-up direction, and accordingly, rotation of the spool 20 in the take-up direction, is not restricted.

Here, when the vehicle enters into a state of rapid deceleration and a large inertia arises at the vehicle, the pretensioner mechanism 190 is operated and the first lock base 158 is rotated suddenly in the take-up direction. Therefore, the spool 20 is rotated in the take-up direction, and the webbing belt 22 is taken-up onto the spool 20. In this way, the force by which the webbing belt 22 restrains the body of the vehicle occupant is improved.

(Operation of Torsion Shaft 24)

The relative rotational force in the take-up direction, which is applied to the first lock base 34, 158 relative to the spool 20 due to the operation of the pretensioner mechanism 190, is large as compared with the sum of the mechanical strength of the first deforming portion 28 of the torsion shaft 24 and the mechanical strength of the stopper wire 174 (in particular, the mechanical strength at the time when the stopper wire 174 is strongly rubbed as will be described later). Therefore, the first deforming portion 28 is twisted by the operation of the pretensioner mechanism 190, in a state in which the first joining portion 30 is connected as is to the first lock base 34, 158. In this way, the first lock base 34, 158 rotates relative to the spool 20 in the take-up direction by the amount of twisting of the first deforming portion 28.

(Operation of Stopper Wire 174)

When the first lock base 34, 158 rotates relative to the spool 20 in the take-up direction in this way, the stopper wire 174 is pulled while being guided by the wire guiding groove 82 of the first lock base 34, 158, in a state in which one end of the stopper wire 174 is disposed as is in the wire anchor hole 84 formed in the first lock base 34, 158. Therefore, as shown in FIG. 7B, the stopper wire 174 which is pulled by the first lock base 34, 158 follows the wire guiding groove 82, while the portion which is accommodated in the stopper accommodating hole 172 is strongly rubbed at the edge of the first lock base 34, 158 side open end of the stopper accommodating hole 172. In this way, the stopper wire 174 is deformed such that the longitudinal direction of the stopper wire 174 becomes the longitudinal direction of the wire guiding groove 82, i.e., the peripheral direction of rotation of the spool 20.

(Operation of Second Locking Mechanism 44)

When the stopper wire 174 moves toward the first lock base 34, 158 side at the inner side of the stopper accommodating hole 172 as described above, the other end side of the stopper wire 174 which is disposed in the spring accommodating hole 62 passes-through the through-hole 66 and comes out from the spring accommodating hole 62, and is pulled into the stopper accommodating hole 172 from the lock base 46 side end portion of the stopper accommodating hole 172. When the stopper wire 174 is pulled-out from the spring accommodating hole 62 in this way (switching state), the interference of the stopper wire 174 with respect to the plate 60 is cancelled. The plate 60, at which interference from the stopper wire 174 is cancelled, receives the urging force of the rotating disc urging spring 64 and rotates within the spring accommodating hole 62.

Because the plate 60 is integral with the rotating disc 54, due to the plate 60 rotating due to the urging force of the rotating disc urging spring 64, the rotating disc 54 rotates in the take-up direction with respect to the second lock base 46. When the rotating disc 54 rotates in the take-up direction with respect to the second lock base 46, the guiding pins 56 push the inner walls of the long holes 58, and cause the second lock pawls 50 to rotate in one direction around the pawl supporting pins 52.

When the second lock pawls 50 rotate in this way, the distal ends of the second lock pawls 50 project-out to the exterior of the second lock base 46. In this way, the second lock pawl ratchets 94 operate and mesh-together with the inner ratchet 92 of the lock ring 90 (see FIG. 3).

During operation of the pretensioner mechanism 190, in the state in which the ring locking ratchet 100 of the ring locking pawl 98 is meshed-together with the outer ratchet 96 of the lock ring 90, even if the second lock pawl ratchets 94 mesh-together with the inner ratchet 92 of the lock ring 90 as described above, rotation of the second lock pawls 50 in the take-up direction is permitted, and rotation of the spool 20 in the take-up direction is permitted.

On the other hand, after the operation of the pretensioner mechanism 190, the webbing belt 22 is pulled by the body of the vehicle occupant, and the spool 20 attempts to rotate in the pull-out direction. Therefore, the second lock pawls 50 attempt to rotate in the pull-out direction together with the second lock base 46.

Accordingly, due to the second lock pawl ratchets 94 meshing-together with the inner ratchet 92 of the lock ring 90 as described above, the rotating force of the second lock base 46 in the pull-out direction is transmitted to the lock ring 90. Therefore, the lock ring 90 attempts to rotate in the pull-out direction. Here, the ring locking ratchet 100 of the ring locking pawl 98 is meshed-together with the outer ratchet 96 of the lock ring 90. Therefore, the ring locking pawl 98 is interfered with by the inner wall of the ring locking pawl accommodating hole 97, and rotation of the ring locking pawl 98, and accordingly, of the lock ring 90, in the pull-out direction is restricted.

When rotation of the lock ring 90 in the pull-out direction is restricted, rotation of the second lock base 46 in the pull-out direction also is restricted. In this state, when the rotational force in the pull-out direction of the spool 20, which is based on the tensile force at the time when the body of the vehicle occupant pulls the webbing belt 22, exceeds the sum of the mechanical strength of the first deforming portion 28 and the mechanical strength of the second deforming portion 40, the second deforming portion 40 as well as the first deforming portion 28 is twisted, in a state in which the second joining portion 42 is connected as is to the second lock base 46. In this way, the spool 20 rotates in the pull-out direction by the amount of twisting of the second deforming portion 40.

Accordingly, the webbing belt 22 is pulled-out from the spool 20 by the amount of rotation of the spool 20 in the pull-out direction. In this way, the force by which the webbing belt 22 restrains the vehicle occupant is weakened slightly, and the energy, which is supplied by the pulling of the webbing belt 22, is absorbed by the amounts of torsional deformation of the first deforming portion 28 and the second deforming portion 40. Therefore, energy absorption by the torsional deformation of the first deforming portion 28 and the second deforming portion 40 arises, and the limit load by the torsion shaft 24 is made to be a high load.

Figure 4:
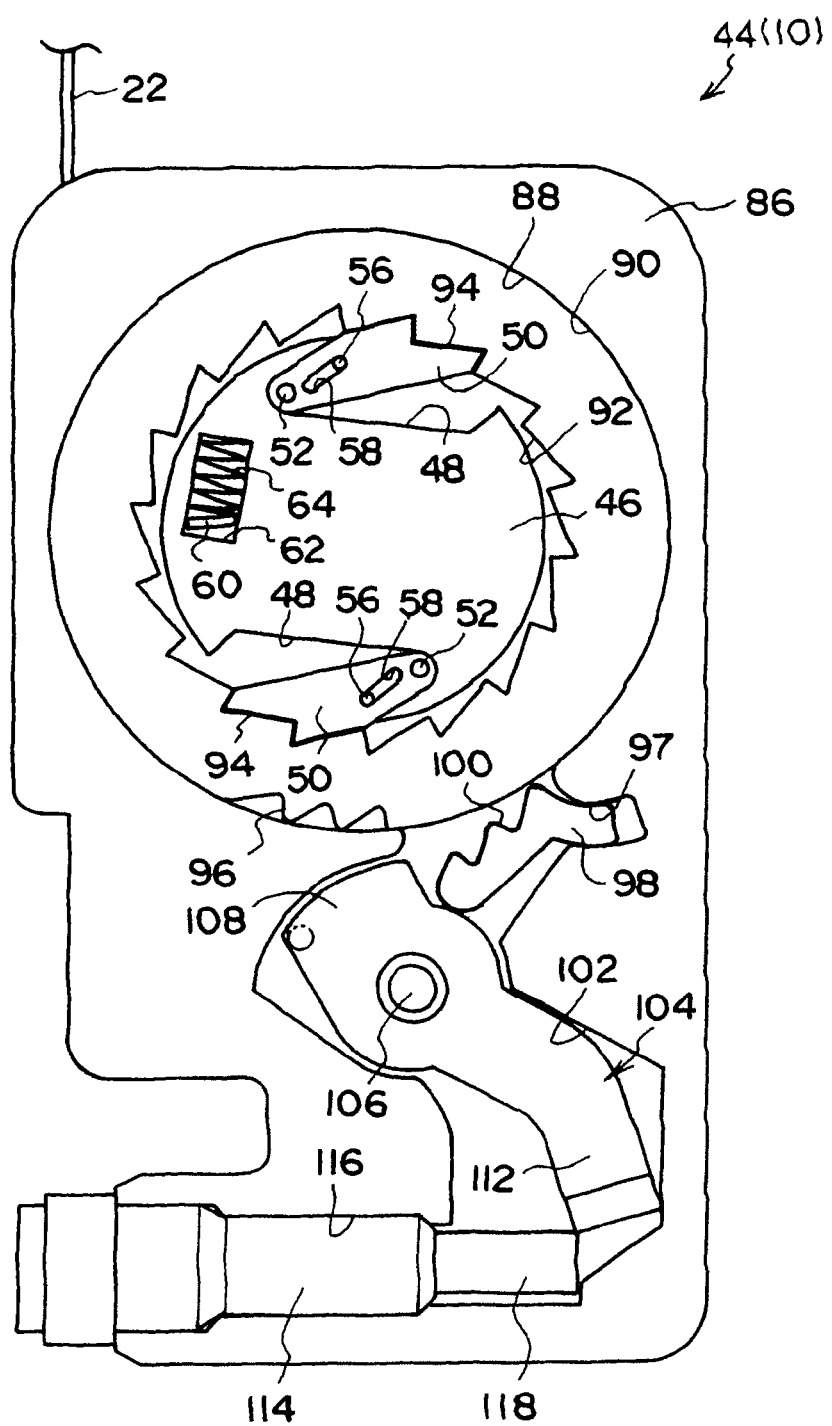
FIG. 4 is a front view corresponding to FIG. 2 and showing an unlocked state of a lock ring of the second locking mechanism in the webbing retractor relating to the first exemplary embodiment of the present invention.

On the other hand, as shown in FIG. 4, before the first locking mechanism 32, 156 operates, when the vehicle enters a state of rapid deceleration or a state immediately before rapid deceleration, and the ECU judges, on the basis of the signal from the physique detecting component, that the physique of the vehicle occupant seated in the seat is less than the predetermined reference value, and the ignition signal is thereby outputted from the ECU, the gas generator 114 operates. When the gas generator 114 operates, the pushing plunger 118 projects-out, and the pushed portion 112 of the supporting arm 104 is pushed by the pushing plunger 118.

Due to the shear pin 110 abutting the supporting arm 104, rotation of the supporting arm 104 in one direction around the arm supporting pin 106 is restricted. However, due to the supporting arm 104 receiving the pushing force from the pushing plunger 118, the supporting arm 104 attempts to rotate in one direction around the arm supporting pin 106, and the supporting arm 104 breaks the shear pin 110 by this rotational force.

The supporting arm 104, which has forcibly cancelled the restriction of rotation by the shear pin 110, rotates in one direction around the arm supporting pin 106 due to the pushing force from the pushing plunger 118. Due to the supporting arm 104 rotating in this way, the ring locking pawl 98 loses the support from the supporting portion 108. Therefore, when the ring locking ratchet 100 of the ring locking pawl 98 attempts to fall downward due to its own weight, the side of the ring locking pawl 98 opposite the ring locking ratchet 100 is guided by the ring locking pawl accommodating hole 97 and moves. In this way, the meshing of the ring locking ratchet 100 with the outer ratchet 96 is cancelled.

In this state, when the rotating force of the spool 20 in the pull-out direction is transmitted to the lock ring 90 via the second lock base 46 and the second lock pawls 50, the lock ring 90 rotates in the pull-out direction together with the spool 20. Accordingly, in this state, twisting arises at the first deforming portion 28, but twisting does not arise at the second deforming portion 40. Therefore, energy absorption due to torsional deformation of the second deforming portion 40 does not arise, and the limit load by the torsion shaft 24 is made to be a low load.

Namely, in the present exemplary embodiment, in both of the first aspect and the second aspect, by controlling the gas generator 114, it is possible to selectively switch to a low load mode, in which the limit load by the torsion shaft 24 is made to be a low load due to twisting being caused at the first deforming portion 28 but deformation not being caused at the second deforming portion 40, and a high load mode, in which the limit load by the torsion shaft 24 is made to be a high load due to deformation being caused at the first deforming portion 28 and the second deforming portion 40. In this way, appropriate energy absorption corresponding to the physique or the like of the vehicle occupant to which the webbing belt 22 is applied is possible.

Due to the relative rotation of the first lock base 34, 158 with respect to the spool 20, the stopper wire 174 is pulled-out from the stopper accommodating hole 172, and the interference of the other end portion of the stopper wire 174 with the plate 60 is cancelled. Further, due to the second lock pawl ratchets 94 of the second lock pawls 50 meshing-together with the inner ratchet 92 of the lock ring 90, the limit load by the torsion shaft 24 can be switched to a high load by control of the gas generator 114.

Here, due to the operation of the pretensioner mechanism 190, the first lock base 34, 158 is rotated relative to the spool 20, and the interference of the other end portion of the stopper wire 174 with the plate 60 is cancelled. In this way, the second lock pawl ratchets 94 of the second lock pawls 50 mesh-together with the inner ratchet 92 of the lock ring 90. Therefore, as shown by arrow Q in FIG. 10, immediately after operation of the pretensioner mechanism 190, the limit load by the torsion shaft 24 is made to be a high load.

In this way, as compared with a case in which the limit load by the torsion shaft 24 is switched from a low load to a high load after operation of the pretensioner mechanism 190, due to the stopper wire 174 being moved and the second lock pawl ratchets 94 of the second lock pawls 50 meshing-together with the inner ratchet 92 of the base 86 due to the rotational force of the spool 20 in the pull-out direction which is based on the tensile force at the time when the body of the vehicle occupant pulls the webbing belt 22, the limit load by the torsion shaft 24 can be made to be a high load at an early stage.

Figure 11:
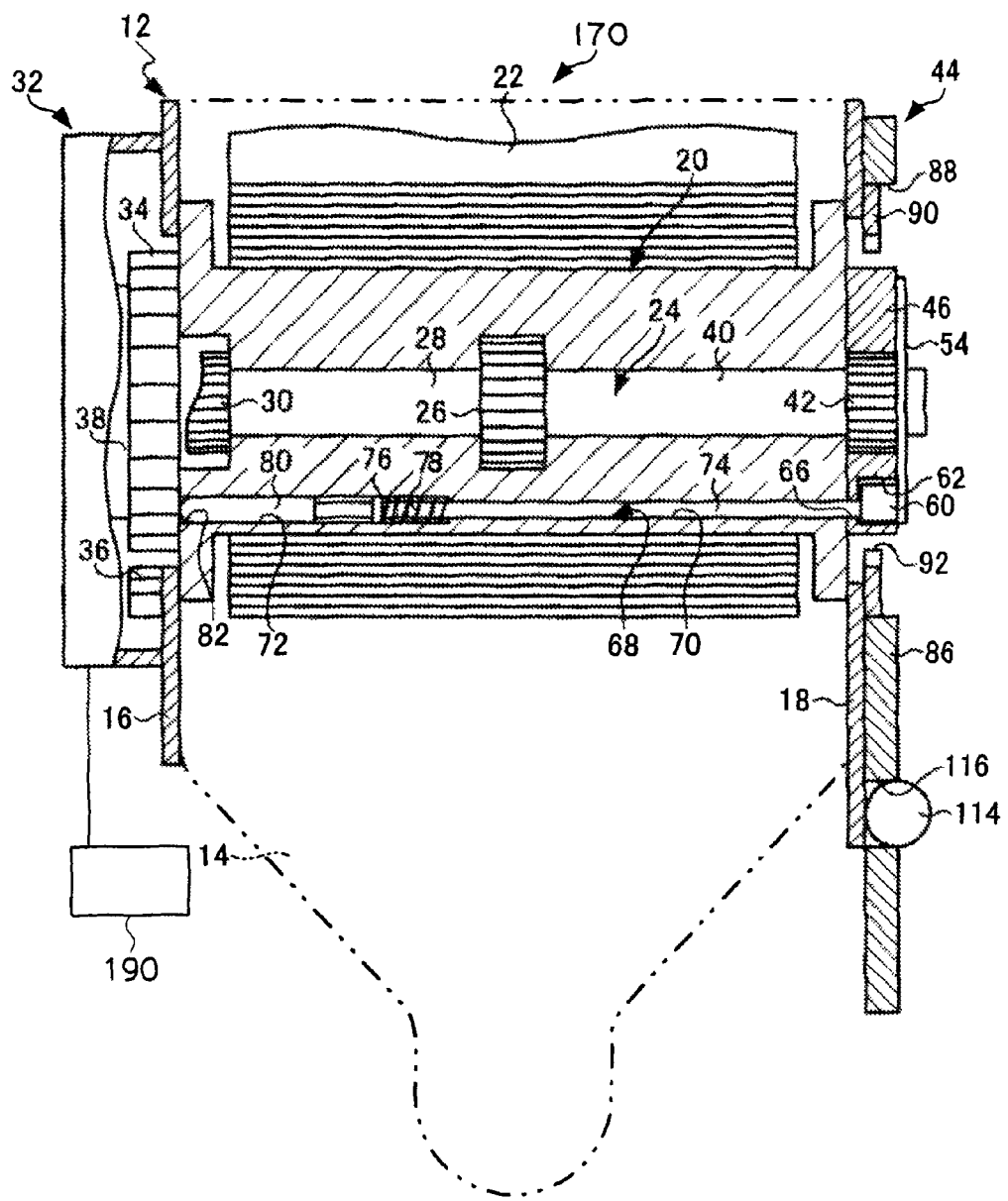
FIG. 11 is a front sectional view showing a summary of the structure of a webbing retractor relating to a modified example of the first exemplary embodiment of the present invention.
Figure 12:
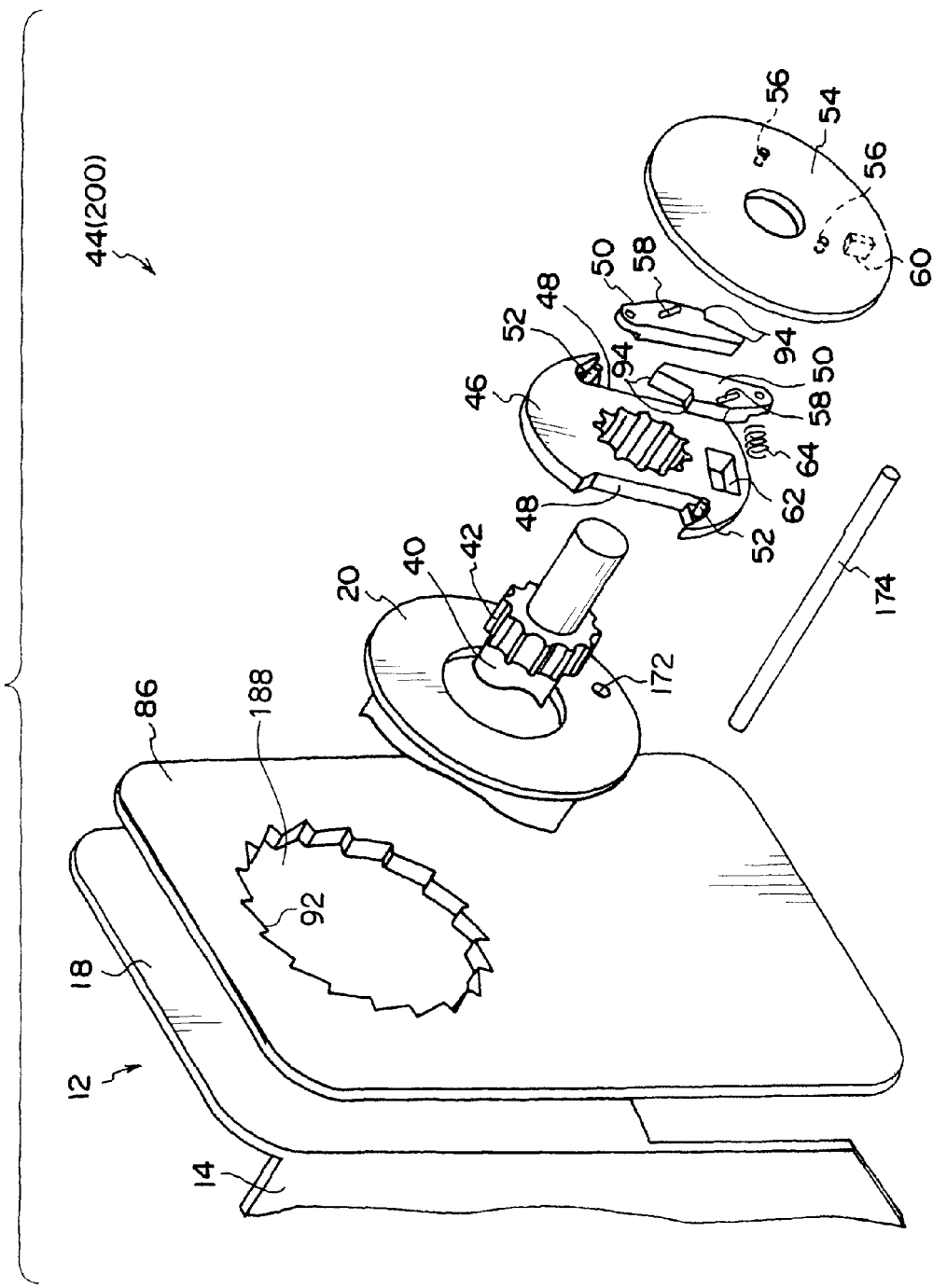
FIG. 12 is an exploded perspective view showing the structure of a second locking mechanism of a webbing retractor relating to a second exemplary embodiment of the present invention.
Figure 13:
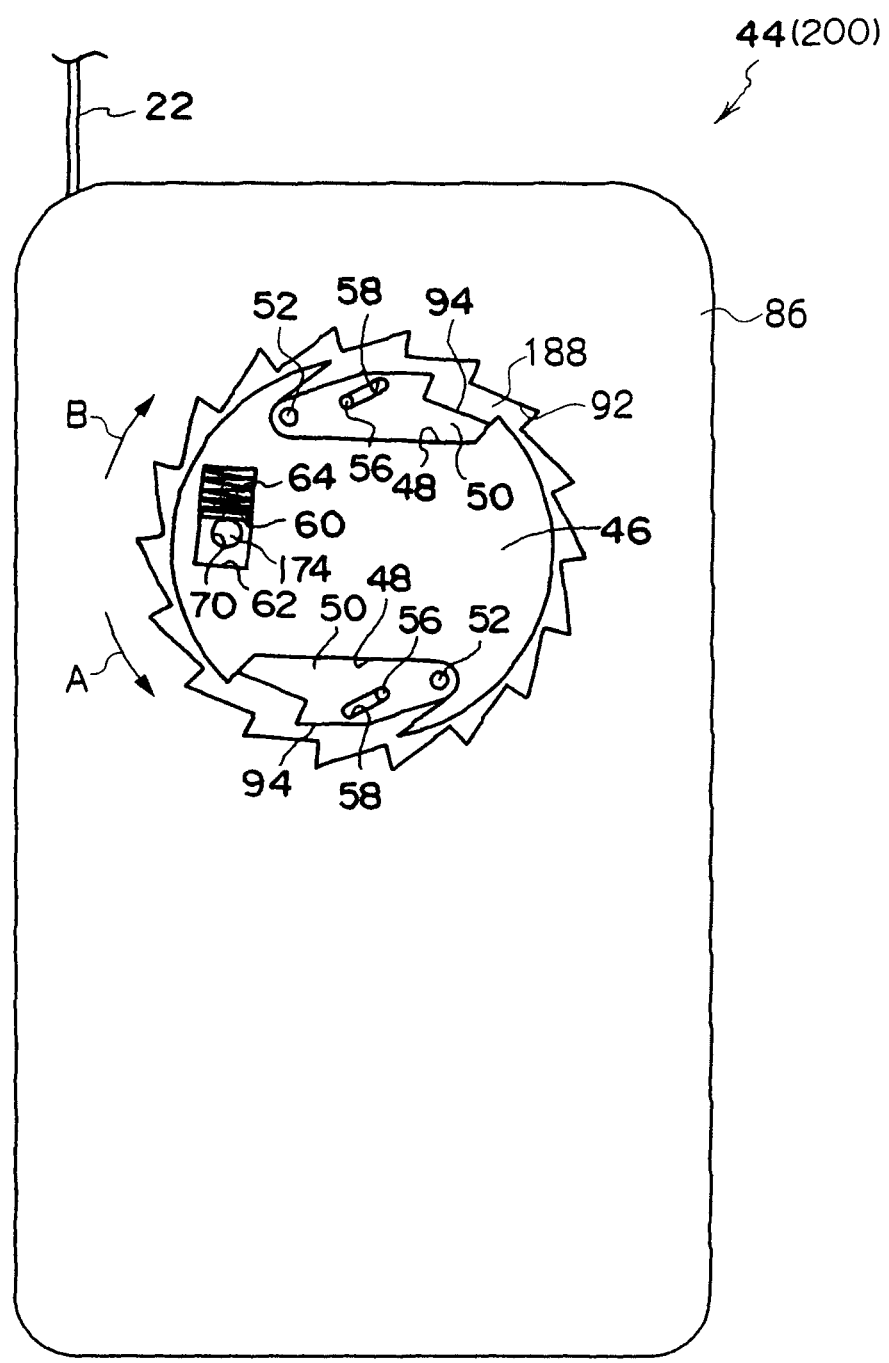
FIG. 13 is a front view showing a summary of the structure of the second locking mechanism in the webbing retractor relating to the second exemplary embodiment of the present invention.
Figure 14:
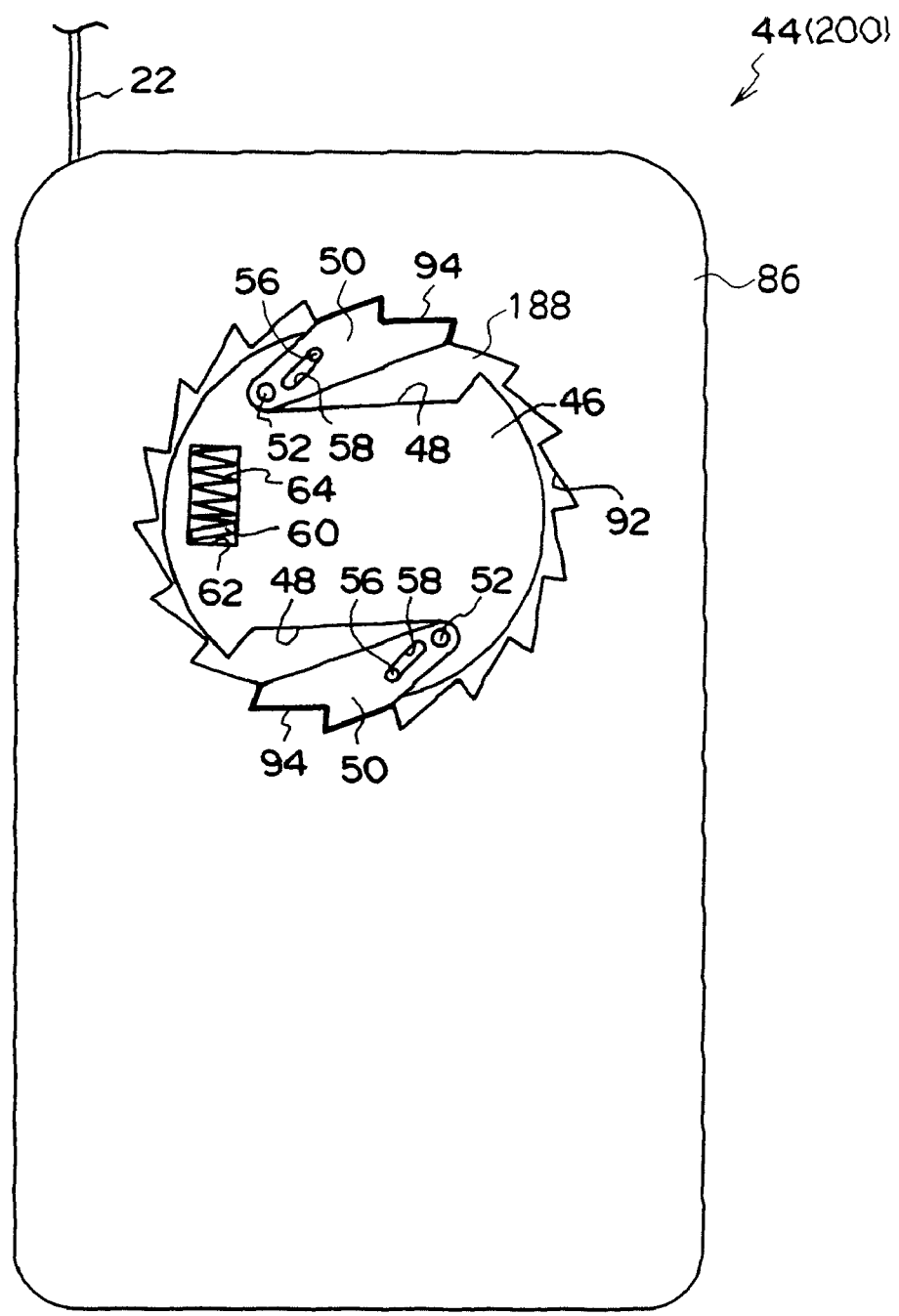
FIG. 14 is a front view corresponding to FIG. 2 and showing an operating state of the second locking mechanism in the webbing retractor relating to the second exemplary embodiment of the present invention.
Figure 15:
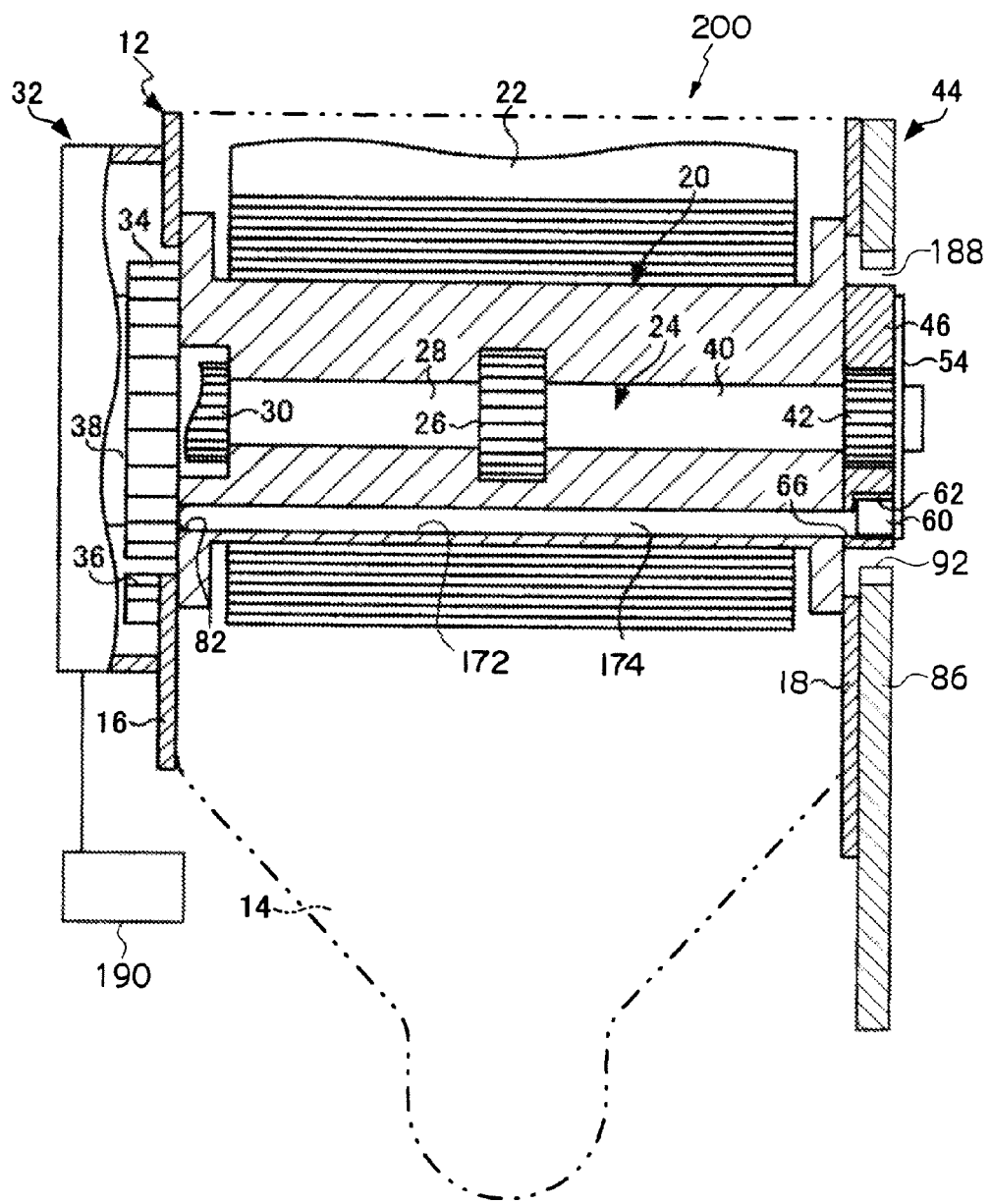
FIG. 15 is a front sectional view showing a summary of the structure of the webbing retractor relating to the second exemplary embodiment of the present invention.

Note that, in the present exemplary embodiment, the stopper accommodating hole 172 is formed in the spool 20, and the stopper wire 174 is accommodated in the stopper accommodating hole 172. However, as in the case of a webbing retractor 170 which corresponds to the first aspect (or the second aspect) and which is shown in FIG. 11, a stopper accommodating hole 68 may be formed in the spool 20, and a stopper 74, a stopper urging spring 78, and a wire 80, which structure the first switching component, may be accommodated in the stopper accommodating hole 68.

In this case, the stopper accommodating hole 68 is structured from a small diameter portion 70, and a large diameter portion 72 whose inner diameter is larger than that of the small diameter portion 70. The large diameter portion 72 is formed in a shape which has a floor portion and which is open at the first lock base 34 side end portion of the spool 20. In contrast, one end of the small diameter portion 70 opens at the second lock base 46 side end portion of the spool 20, and the other end of the small diameter portion 70 opens at the floor portion of the large diameter portion 72.

The stopper 74 is formed in the shape of a rod which is long along the axial direction of the spool 20. One end of the stopper 74 passes through the small diameter portion 70 and is disposed in the large diameter portion 72. A disc-shaped flange 76 extends from the outer peripheral portion of the portion of the stopper 74 which portion is disposed in the large diameter portion 72. The stopper urging spring 78 (stopper urging component) is disposed between this flange 76 and the floor portion of the large diameter portion 72. The stopper urging spring 78 is structured from a compression coil spring. The stopper urging spring 78 urges the flange 76, and accordingly the stopper 74, toward the first lock base 34 side.

A wire 80 (second energy absorbing member) is accommodated in the large diameter portion 72. One end side of the wire 80 projects-out from the open end of the large diameter portion 72 to the exterior of the spool 20. The one end portion of the wire 80 is bent toward the first lock base 34 within a wire guiding groove 82. The one end portion of the wire 80 is disposed within a wire anchor hole 84 which is formed in the first lock base 34.

The other end portion of the wire 80 in the large diameter portion 72 abuts the end portion of the stopper 74 in a state of opposing the stopper 74. The other end portion of the wire 80 restricts movement of the stopper 74 toward the first lock base 34 side due to the urging force of the stopper urging spring 78.

In the state in which movement of the stopper 74 is restricted by the wire 80, the other end side of the stopper 74 passes-through the small diameter portion 70 and projects-out to the exterior of the spool 20. Further, the other end side of the stopper 74 passes through the through-hole 66, which is formed in the floor portion of the spring accommodating hole 62 of the second lock base 46, and is disposed in the spring accommodating hole 62. The other end of the stopper 74 which is disposed in the spring accommodating hole 62 is positioned at the side of the plate 60 opposite the side at which the rotating disc urging spring 64 is located. In this way, the stopper 74 interferes with the plate 60 which attempts to rotate due to the urging force of the rotating disc urging spring 64.

Here, the relative rotational force in the take-up direction, which is applied to the first lock base 34 relative to the spool 20 due to operation of the pretensioner mechanism 190, is large as compared with the sum of the mechanical strength of the first deforming portion 28 of the torsion shaft 24 and the mechanical strength of the wire 80 (in particular, the mechanical strength at the time when the wire 80 is strongly rubbed). Therefore, the first deforming portion 28 is twisted by the operation of the pretensioner mechanism 190. In this way, the first lock base 34 rotates relative to the spool 20 in the take-up direction by the amount of twisting of the first deforming portion 28.

Further, when a portion of or all of the wire 80 is pulled-out from the stopper accommodating hole 68 in the same way as the stopper wire 174 due to the relative rotation of the first lock base 34 with respect to the spool 20, the other end portion of the wire 80 moves away from the one end of the stopper 74. When the other end of the wire 80 moves away from the one end of the stopper 74 in this way, the stopper 74 moves toward the first lock base 34 so as to follow the wire 80 due to the urging force of the stopper urging spring 78.

When the stopper 74 moves toward the first lock base 34, the other end side of the stopper 74, which had been disposed in the spring accommodating hole 62, passes-through the through-hole 66 and comes out from the spring accommodating hole 62. When the stopper 74 comes out from the spring accommodating hole 62, the interference of the stopper 74 with the plate 60 is cancelled. In this way, in the same way as in the first exemplary embodiment, the second lock pawl ratchets 94 of the second lock pawls 50 mesh-together with the inner ratchet 92 of the lock ring 90.

<Structure of Second Exemplary Embodiment>

A second exemplary embodiment of the present invention will be described next by using FIG. 12 through FIG. 16.

A webbing retractor 200 relating to the present exemplary embodiment has a substantially similar structure as the first aspect (or the second aspect) of the first exemplary embodiment, but differs with regard to the following points.

In the webbing retractor 200 relating to the present exemplary embodiment, the circular hole 88 and the lock ring 90 (including the outer ratchet 96) of the first exemplary embodiment are not provided at the base 86.

A base accommodating hole 188 is formed in the base 86 coaxially with the spool 20. The inner diameter of the base accommodating hole 188 is sufficiently larger than the second lock base 46. The second lock base 46 is inserted in the base accommodating hole 188 coaxially and so as to be able to rotate relatively. The inner ratchet 92 of the first exemplary embodiment is formed at the inner peripheral portion of the base accommodating hole 188. When the second lock pawls 50 rotate in one direction around the pawl supporting pins 52 and the distal end sides of the second lock pawls 50 project-out to the outer sides of the pawl accommodating portions 48, the second lock pawl ratchets 94 mesh-together with the inner ratchet 92.

The ring locking pawl accommodating hole 97, the ring locking pawl 98 (including the ring locking ratchet 100), the supporting arm accommodating hole 102, the supporting arm 104 (including the supporting portion 108 and the pushed portion 112), the arm supporting pin 106, the shear pin 110, the gas generator 114 (including the pushing plunger 118), and the generator accommodating hole 116 of the first exemplary embodiment are not provided at the base 86.

Further, the stopper wire 174 functions as the switching component.

<Operation and Effects of Second Exemplary Embodiment>

The operation and effects of the present exemplary embodiment will be described next.

In the present webbing retractor 200, in the same way as in the first exemplary embodiment, when the vehicle rapidly decelerates and the first locking mechanism 32 operates, rotation of the rotating member 38 in the pull-out direction is restricted. Further, when the pretensioner mechanism 190 operates, the first lock base 34 is suddenly rotated in the take-up direction.

When the first lock base 34 is suddenly rotated in the take-up direction due to the operation of the pretensioner mechanism 190, relative rotational force in the take-up direction is applied to the first lock base 34 relative to the spool 20.

If the physique or the like of the vehicle occupant is small, the rotational force in the pull-out direction of the spool 20 due to the vehicle occupant pulling the webbing belt 22 is small. Therefore, the relative rotational force in the take-up direction which is applied to the first lock base 34 relative to the spool 20 due to the operation of the pretensioner mechanism 190 is small.

On the other hand, if the physique or the like of the vehicle occupant is large, the rotational force in the pull-out direction of the spool 20 due to the vehicle occupant pulling the webbing belt 22 is large. Therefore, the relative rotational force in the take-up direction which is applied to the first lock base 34 relative to the spool 20 due to the operation of the pretensioner mechanism 190 is large.

Here, when the physique or the like of the vehicle occupant is small, the relative rotational force in the take-up direction, which is applied to the first lock base 34 relative to the spool 20 due to the operation of the pretensioner mechanism 190, is small as compared with the sum of the mechanical strength of the first deforming portion 28 of the torsion shaft 24 and the mechanical strength of the stopper wire 174 (in particular, the mechanical strength at the time when the stopper wire 174 is strongly rubbed).

Therefore, even if the first lock base 34 is rotated suddenly in the take-up direction due to the operation of the pretensioner mechanism 190, the first deforming portion 28 does not twist, and the first lock base 34 does not rotate relative to the spool 20 in the take-up direction.

In this way, when, after operation of the pretensioner mechanism 190, the rotational force in the pull-out direction of the spool 20, which is based on the tensile force at the time when the body of the vehicle occupant pulls the webbing belt 22, exceeds the mechanical strength of the first deforming portion 28, the first deforming portion 28 twists, and the spool 20 rotates in the pull-out direction by the amount of twisting of the first deforming portion 28. Accordingly, the webbing belt 22 is pulled-out from the spool 20 by the amount of rotation of the spool 20 in the pull-out direction. In this way, the force by which the webbing belt 22 restrains the vehicle occupant weakens, and the energy, which is supplied by the pulling of the webbing belt 22, is absorbed by the amount of torsional deformation of the first deforming portion 28. Therefore, energy absorption due to torsional deformation of the second deforming portion 40 does not arise, and the limit load by the torsion shaft 24 (the load which is applied from the webbing belt 22 to the vehicle occupant and which the torsion shaft 24 limits) is made to be a low load.

On the other hand, when the physique or the like of the vehicle occupant is large, the relative rotational force in the take-up direction, which is applied to the first lock base 34 relative to the spool 20 due to the operation of the pretensioner mechanism 190, is large as compared with the sum of the mechanical strength of the first deforming portion 28 of the torsion shaft 24 and the mechanical strength of the stopper wire 174.

Therefore, when the first lock base 34 is rotated suddenly in the take-up direction due to the operation of the pretensioner mechanism 190, the first deforming portion 28 twists, and the first lock base 34 rotates in the take-up direction relative to the spool 20 by the amount of twisting of the first deforming portion 28.

In this way, in the same way as in the first exemplary embodiment, in a state in which one end of the stopper wire 174 is disposed as is in the wire anchor hole 84 formed in the first lock base 34, the stopper wire 174 is pulled while being guided by the wire guiding groove 82 of the first lock base 34, and the other end side of the stopper wire 174 passes-through the through-hole 66 and comes out from the spring accommodating hole 62. Therefore, the second lock pawl ratchets 94 mesh-together with the inner ratchet 92 of the base 86.

Even if the second lock pawl ratchets 94 mesh-together with the inner ratchet 92 of the base 86 as described above while the pretensioner mechanism 190 is operating, rotation of the second lock pawls 50 in the take-up direction is permitted, and rotation of the spool 20 in the take-up direction is permitted.

On the other hand, after the pretensioner mechanism 190 operates, the webbing belt 22 is pulled by the body of the vehicle occupant, and the spool 20 attempts to rotate in the pull-out direction. However, due to the second lock pawl ratchets 94 meshing-together with the inner ratchet 92 of the base 86 as described above, rotation of the second lock pawls 50 as well as the second lock base 46 in the pull-out direction is restricted.

In this state, when the rotational force in the pull-out direction of the spool 20, which is based on the tensile force at the time when the body of the vehicle occupant pulls the webbing belt 22, exceeds the sum of the mechanical strength of the first deforming portion 28 and the mechanical strength of the second deforming portion 40, the second deforming portion 40 as well as the first deforming portion 28 is twisted, in a state in which the second joining portion 42 is connected as is to the second lock base 46. In this way, the spool 20 rotates in the pull-out direction by the amounts of twisting of the first deforming portion 28 and the second deforming portion 40.

Accordingly, the webbing belt 22 is pulled-out from the spool 20 by the amount of rotation of the spool 20 in the pull-out direction. Therefore, the force by which the webbing belt 22 restrains the vehicle occupant weakens slightly, and the energy, which is supplied by the pulling of the webbing belt 22, is absorbed by the amounts of torsional deformation of the first deforming portion 28 and the second deforming portion 40. In this way, energy absorption due to torsional deformation of the first deforming portion 28 and the second deforming portion 40 arises, and the limit load by the torsion shaft 24 is made to be a high load.

Namely, in the present exemplary embodiment, it is possible to switch to a low load mode, in which the limit load by the torsion shaft 24 is made to be a low load due to twisting being caused at the first deforming portion 28 but deformation not being caused at the second deforming portion 40, and a high load mode, in which the limit load by the torsion shaft 24 is made to be a high load due to deformation being caused at the first deforming portion 28 and the second deforming portion 40. In this way, appropriate energy absorption corresponding to the physique or the like of the vehicle occupant to which the webbing belt 22 is applied is possible.

Here, as described above, at the time when the limit load by the torsion shaft 24 is made to be a high load, due to the operation of the pretensioner mechanism 190, the stopper wire 174 is moved, and the second lock pawl ratchets 94 of the second lock pawls 50 mesh-together with the inner ratchet 92 of the base 86. In this way, the limit load by the torsion shaft 24 is switched from low load to high load. Therefore, in the same way as in the first exemplary embodiment, the limit load by the torsion shaft 24 is made to be a high load immediately after operation of the pretensioner mechanism 190.

In this way, as compared with a case in which the limit load by the torsion shaft 24 is switched from a low load to a high load after operation of the pretensioner mechanism 190, due to the stopper wire 174 being moved and the second lock pawl ratchets 94 of the second lock pawls 50 meshing-together with the inner ratchet 92 of the base 86 due to the rotational force of the spool 20 in the pull-out direction which is based on the tensile force at the time when the body of the vehicle occupant pulls the webbing belt 22, the limit load by the torsion shaft 24 can be made to be a high load at an early stage.

Note that, in the present exemplary embodiment, the stopper accommodating hole 172 is formed in the spool 20, and the stopper wire 174 is accommodated in the stopper accommodating hole 172. However, in the same way as the webbing retractor 170 (see FIG. 11), in a webbing retractor corresponding to the first aspect (or the second aspect) of the first exemplary embodiment, the stopper accommodating hole 68 may be formed in the spool 20, and the stopper 74, the stopper urging spring 78, and the wire 80, which structure the switching component, may be accommodated in the stopper accommodating hole 68. In this case, the mechanical strength of the wire 80 is made to be the same as the mechanical strength of the stopper wire 174 in the second exemplary embodiment.

What is claimed is:

1. A webbing retractor comprising:
a take-up shaft on which a webbing, which is applied to a vehicle occupant, is wound, and, due to the take-up shaft being rotated in a take-up direction, the webbing is taken-up, and, due to the take-up shaft being rotated in a pull-out direction, the webbing is pulled-out;
a driving member provided at the take-up shaft and able to rotate integrally with the take-up shaft;
a pretensioner mechanism which, by being operated at a time of a vehicle emergency, rotates the driving member in the take-up direction and rotates the take-up shaft in the take-up direction;
a first locking component which, at the time of the vehicle emergency, restricts rotation of the driving member in the pull-out direction;
a force limiter mechanism including a first deforming portion which connects the driving member with the take-up shaft so as to be able to rotate integrally, the force limiter mechanism further including a second deforming portion which connects to the take-up shaft, the force limiter mechanism, at the time of the vehicle emergency, permitting rotation of the take-up shaft in the pull-out direction and limiting a load, which is applied to the vehicle occupant from the webbing, to a limit load, the force limiter mechanism being able to switch the limit load at least to a low load and a high load, the force limiter mechanism also including;
a first switching component set in a switching state due to the driving member rotating in the take-up direction relative to the take-up shaft due to operation of the pretensioner mechanism; and
a second switching component, operated due to the first switching component being set in the switching state, such that both the first and second deforming portions are deformed, thereby switching the limit load to the high load, the second switching component including
a first rotating member able to rotate integrally with the take-up shaft by the second deforming portion;
a switching mechanism, the limit load being switched to the high load due to the switching mechanism restricting rotation of the first rotating member in the pull-out direction at a time when the second switching component is operated, and
a second rotating member provided at the switching mechanism and able to rotate relative to the first rotating member,
wherein, due to the switching mechanism restricting rotation of the second rotating member in the pull-out direction at the time when the second switching component is operated, the switching mechanism restricts the rotation of the first rotating member in the pull-out direction integrally with the second rotating member at the time when the second switching component is operated.

2. A vehicle comprising the webbing retractor of claim 1.

3. A method of controlling a webbing retractor which has:
a take-up shaft on which a webbing, which is applied to a vehicle occupant, is wound, and, due to the take-up shaft being rotated in a take-up direction, the webbing is taken-up, and, due to the take-up shaft being rotated in a pull-out direction, the webbing is pulled-out;
a driving member provided at the take-up shaft and able to rotate integrally with the take-up shaft;
a pretensioner mechanism which, by being operated at a time of a vehicle emergency, rotates the driving member in the take-up direction and rotates the take-up shaft in the take-up direction;
a first locking component which, at the time of the vehicle emergency, restricts rotation of the driving member in the pull-out direction; and
a force limiter mechanism including a first deforming portion which connects the driving member with the take-up shaft so as to be able to rotate integrally, the force limiter mechanism further including a second deforming portion which connects to the take-up shaft, the force limiter mechanism, at the time of the vehicle emergency, permitting rotation of the take-up shaft in the pull-out direction and limiting a load, which is applied to the vehicle occupant from the webbing, to a limit load, the force limiter mechanism being able to switch the limit load at least to a low load and a high load, the force limiter mechanism also including a first switching component set in a switching state due to the driving member rotating in the take-up direction relative to the take-up shaft due to operation of the pretensioner mechanism, and a second switching component, operated due to the first switching component being set in the switching state, such both the first and second deforming portions are deformed, thereby switching the limit load to the high load,
wherein the second switching component has a first rotating member able to rotate integrally with the take-up shaft by the second deforming portion, and, due to a switching mechanism of the second switching component restricting rotation of the first rotating member in the pull-out direction at a time when the second switching component is operated, the limit load is switched to the high load, and
wherein the webbing retractor has a second rotating member provided at the switching mechanism and able to rotate relative to the first rotating member, and
wherein, due to the switching mechanism restricting rotation of the second rotating member in the pull-out direction at the time when the second switching component is operated, the switching mechanism restricts the rotation of the first rotating member in the pull-out direction integrally with the second rotating member at the time when the second switching component is operated,
the method comprising:
setting the first switching component in a switching state due to the driving member rotating in the take-up direction relative to the take-up shaft by operation of the pretensioner mechanism; and
switching the limit load to the high load resulting in both the first and second deforming sections being deformed by operating the second switching component due to the first switching component being set in the switching state.

* * * * *